(12) United States Patent
Mehrvar

(10) Patent No.: US 9,781,495 B2
(45) Date of Patent: Oct. 3, 2017

(54) OPTICAL SWITCH ARCHITECTURE

(71) Applicant: Huawei Technologies Co., Ltd., Shenzhen (CN)

(72) Inventor: Hamid Mehrvar, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/821,034

(22) Filed: Aug. 7, 2015

(65) Prior Publication Data
US 2016/0047991 A1  Feb. 18, 2016

Related U.S. Application Data

(60) Provisional application No. 62/037,460, filed on Aug. 14, 2014.

(51) Int. Cl.
*H04Q 11/00* (2006.01)

(52) U.S. Cl.
CPC ... *H04Q 11/0005* (2013.01); *H04Q 2011/005* (2013.01); *H04Q 2011/0039* (2013.01); *H04Q 2011/0056* (2013.01)

(58) Field of Classification Search
CPC .......... H04Q 11/0005; H04Q 11/0066; H04Q 2011/0058
USPC ......................................... 398/45
See application file for complete search history.

(56) References Cited

U.S. PATENT DOCUMENTS

| 5,541,914 | A | 7/1996 | Krishnamoorthy et al. |
|---|---|---|---|
| 6,427,037 | B1* | 7/2002 | Okayama ........... H04Q 11/0005 385/16 |
| 6,542,655 | B1 | 4/2003 | Dragone |
| 6,665,495 | B1* | 12/2003 | Miles ................ H04L 45/00 370/351 |
| 7,403,473 | B1 | 7/2008 | Mehrvar et al. |
| 9,152,748 | B2* | 10/2015 | Zievers .............. G06F 15/781 |
| 2002/0051446 | A1 | 5/2002 | Klausmeier et al. |
| 2004/0086220 | A1* | 5/2004 | Mino ................. G02F 1/31 385/22 |
| 2012/0293934 | A1 | 11/2012 | Boduch et al. |
| 2014/0334819 | A1 | 11/2014 | Mehrvar et al. |

FOREIGN PATENT DOCUMENTS

CN          1356569 A          7/2002

OTHER PUBLICATIONS

Foreign Communication From a Counterpart Application, PCT Application No. PCT/CN2015/086654, International Search Report dated Oct. 21, 2015, 7 pages.
Foreign Communication From a Counterpart Application, PCT Application No. PCT/CN2015/086654, Written Opinion dated Oct. 21, 2015, 3 pages.

(Continued)

*Primary Examiner* — Dalzid Singh
(74) *Attorney, Agent, or Firm* — Conley Rose, P.C.

(57) ABSTRACT

An optical switch comprises a first stage comprising N optical inputs, wherein N is an integer power of 2 and is 16 or greater, and N first sub-switches, wherein each first sub-switch comprises 1 of the optical inputs and 4 first outputs, and a second stage coupled to the first stage and comprising 16 second sub-switches, wherein each second sub-switch comprises M second inputs and M second outputs, and wherein M is equal to N/4.

21 Claims, 20 Drawing Sheets

(56) References Cited

OTHER PUBLICATIONS

Qian, et al., "Scalable Photonic Switch with Crosstalk Suppression for Datacenters and Optical Networks," OptoElectronics and Communications Conference (OECC) 2015, Shanghai, China, Jun. 28, 2015, 3 pages.
Okayama, H., et al., "Two-Module Stage Optical Switch Network," XP000989274, Journal of Lightwave Technology, vol. 18, No. 4, Apr. 2000, pp. 469-476.
Kabacinski, W., et al., "Modified Dilated Benes Networks for Photonic Switching," XP011009468, IEEE Transactions on Communications, vol. 47, No. 8, Aug. 1999, pp. 1253-1259.
Foreign Communication From A Counterpart Application, European Application No. 15831441.9, Extended European Search Report dated Jul. 28, 2017, 10 pages.

* cited by examiner

OPTICAL SWITCH ARCHITECTURE

CROSS-REFERENCE TO RELATED APPLICATIONS

The present application claims priority to U.S. Provisional Patent Application 62/037,460 filed Aug. 14, 2014 by Hamid Mehrvar and titled "Optical Switch," which is incorporated by reference.

BACKGROUND

High-performance computing (HPC) delivers large computational power over a short period of time. HPC may be measured in terms of floating point operations per second (FLOPS). In contrast, high-throughput computing (HTC) completes a large number of computational tasks over a long period of time, for instance, weeks or months. HTC employs multiple central processing units (CPUs) and memories in a distributed network. Software oversees the HTC network to effectively harness the power of the CPUs. An optical or photonic switch may interconnect the CPUs and memories and may therefore be a key component to implement a high-quality network. An optical switch is any device with inputs, outputs, and paths to connect the inputs and outputs in order to switch optical signals.

SUMMARY

In one embodiment, the disclosure includes an optical switch comprising a first stage comprising N optical inputs, wherein N is an integer power of 2 and is 16 or greater, and N first sub-switches, wherein each first sub-switch comprises 1 of the optical inputs and 4 first outputs, and a second stage coupled to the first stage and comprising 16 second sub-switches, wherein each second sub-switch comprises M second inputs and M second outputs, and wherein M is equal to N/4.

In another embodiment, the disclosure includes an optical switching system comprising an optical switch comprising a first stage of cells comprising N first inputs, wherein N is an integer, a second stage of cells coupled to the first stage, a third stage of cells coupled to the second stage, wherein at least one of the second stage and the third stage comprises M×M sub-switches, and wherein M is equal to N/4, and a fourth stage of cells coupled to the third stage and comprising N fourth outputs, and a processor coupled to the optical switch.

In yet another embodiment, the disclosure includes a method of designing an optical switch, the method comprising determining N, wherein N is an integer power of 2 and is 16 or greater, determining M, wherein M is equal to N/4, providing N optical inputs, providing a first stage of N first sub-switches, wherein each first sub-switch comprises 1 first input and 4 first outputs, coupling the first inputs to the optical inputs, providing a second stage of 16 second sub-switches, wherein each second sub-switch comprises M second inputs and M second outputs, and coupling the second stage to the first stage.

In yet another embodiment, the disclosure includes a method comprising receiving, from a device, a request to route a packet through an optical switch, determining a path through the optical switch, wherein the path passes through one of N optical inputs of a first stage of the optical switch, one of M inputs of a second sub-switch of a second stage of the optical switch, one of M inputs of a third sub-switch of a third stage of the optical switch, and one of N optical outputs of a fourth stage of the optical switch, and wherein N is an integer and M is equal to N/4, and transmitting, to the optical switch, an instruction to route the packet via the path.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
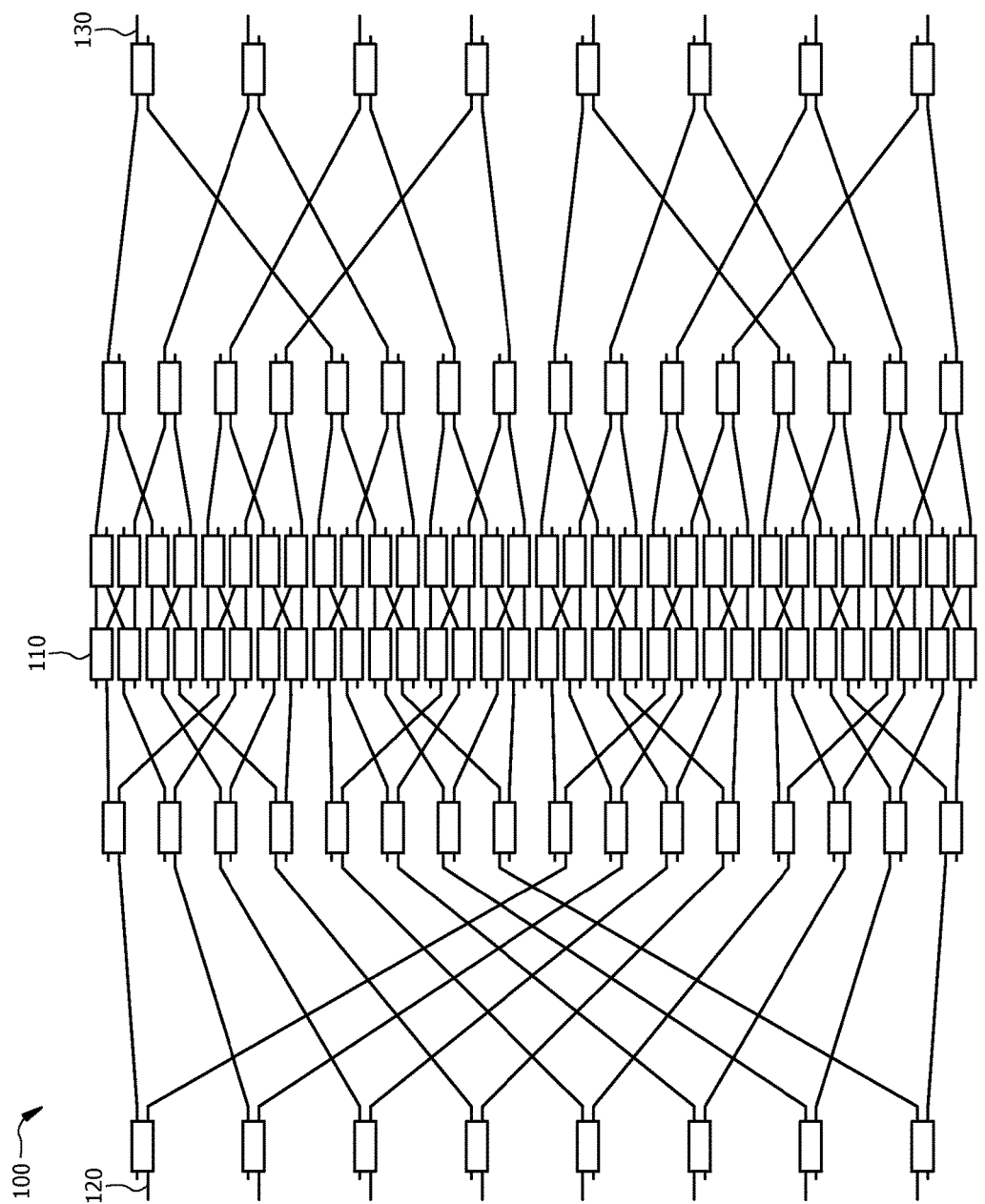
FIG. 1 is a schematic diagram of an 8×8 dilated banyan optical switch.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

An optical switch having N inputs and M outputs may be referred to as an N×M switch. N and M are any positive integers and may be the same. A desirable optical switch should meet the following seven criteria: a small cell count; low crosstalk; a short total delay through fast real-time path, or route, calculation, fast switch setup, and fast switch speed; an acceptably low amount of blocking (ideally no blocking); low insertion loss; a scalable architecture; and a flexible architecture.

An optical switching cell, referred to herein simply as a cell, is a basic building block of an optical switch. A cell, much like the switch it is a part of, has I inputs and J outputs. I and J are any positive integers and may be the same. For instance, a cell size may be 1×2, 2×1, or 2×2. A cell may therefore be defined as the smallest indivisible switching element that has inputs, outputs, and paths connecting the two.

Cell count refers to the number of cells in an optical switch. A small cell count enables the optical switch to be compact. Crosstalk refers to undesirable signal coupling. For example, when a cell receives an optical signal at an input and directs the signal to a desired output of two possible outputs, not all of the optical power is transferred to the desired output. Rather, a small amount of leakage occurs, resulting in part of the optical power being directed to the undesired output. In a 2×2 cell, this results in different input signals contaminating each other, which is referred to as crosstalk. One way of reducing crosstalk is to ensure that each cell receives only one input signal at any given time.

Total delay is defined as the time period from when a signal enters the optical switch to when the signal exits the optical switch. Total delay is dependent on path calculation, switch setup, and switch speed. Path calculation refers to the process of determining the best path connecting an input to an output. Switch setup refers to the process of identifying all the cells in the path and preparing those cells for use. Switch speed refers to the speed of switching from a prior path to the new path.

Blocking occurs when paths connecting different inputs and outputs overlap. Non-blocking means that there is no such overlap. There are generally three types of non-blocking: strict-sense non-blocking, wide-sense non-blocking, and rearrangeable non-blocking. Strict-sense non-blocking means that an input can always be connected to an output without having to rearrange existing paths. Wide-sense non-blocking means that an input can always be connected to an output without having to rearrange existing paths provided that certain rules are followed. Rearrangeable non-blocking means that an input can always be connected to an output, but doing so may require rearranging existing paths.

Insertion loss refers to the loss of the signal power from the input to the output of the optical switch due to the existence of the optical switch. Insertion loss is proportional to the number of cells in a path connecting an input and an output. An optical switch with large insertion loss may need to be compensated for using an amplifier to amplify signals. Large insertion losses decrease the signal-to-noise ratio and deteriorate signal quality. A scalable architecture requires the optical switch to be constructed in such a way that an increased number of inputs and outputs do not require significant demand from additional cells. A flexible architecture requires the optical switch to be able to add or delete cells while maintaining its functionality.

FIG. 1 is a schematic diagram of an 8×8 dilated banyan optical switch 100. The optical switch 100 comprises 112 cells 110, 8 inputs 120, and 8 outputs 130. The cells 110 are 2×2 cells that are used as 1×2 cells, 2×1 cells, and 2×2 cells. One skilled in the art will appreciate that, in other embodiments, the use of 1×2 and 2×1 cells in place of the 2×2 cells with a restricted input or output could be used. The architecture of the optical switch 100 provides low crosstalk, low insertion loss, fast path calculation, and non-blocking, but requires a high cell count that is not possible in most applications requiring a single chip, is not scalable, and is not flexible.

Figure 2:
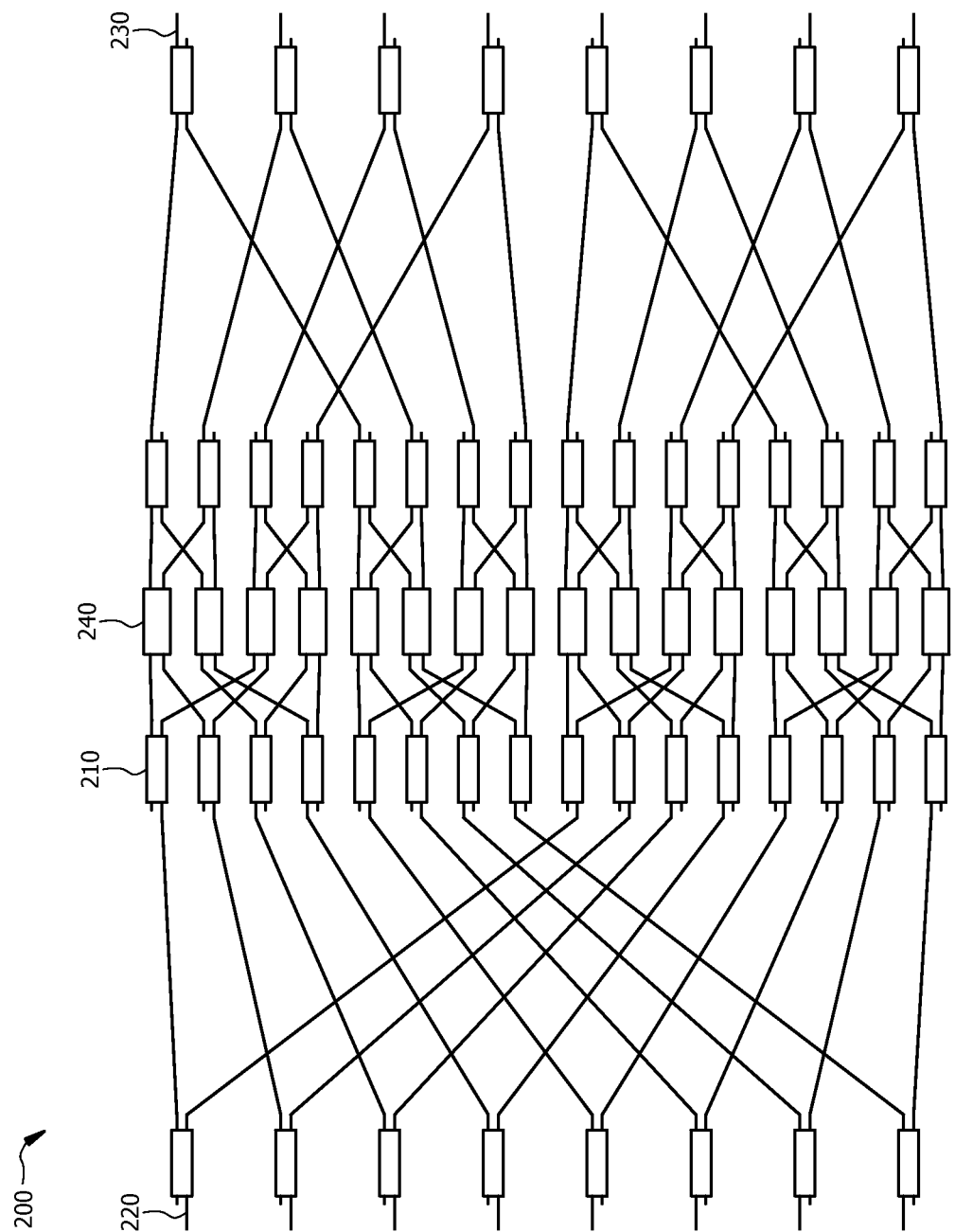
FIG. 2 is a schematic diagram of an 8×8 simplified tree optical switch.

FIG. 2 is a schematic diagram of an 8×8 simplified tree optical switch 200. The optical switch 200 comprises 64 cells 210, 8 inputs 220, and 8 outputs 230 The cells 210 are 2×2 cells that are used as 1×2 cells, 2×2 cells, and 2×1 cells. The architecture of the optical switch 200 provides low insertion loss, fast path calculation, a low cell count, and non-blocking, but has medium crosstalk because two signals may pass through 2×2 cells 240 and thus interfere, is not scalable, and is not flexible.

Figure 3:
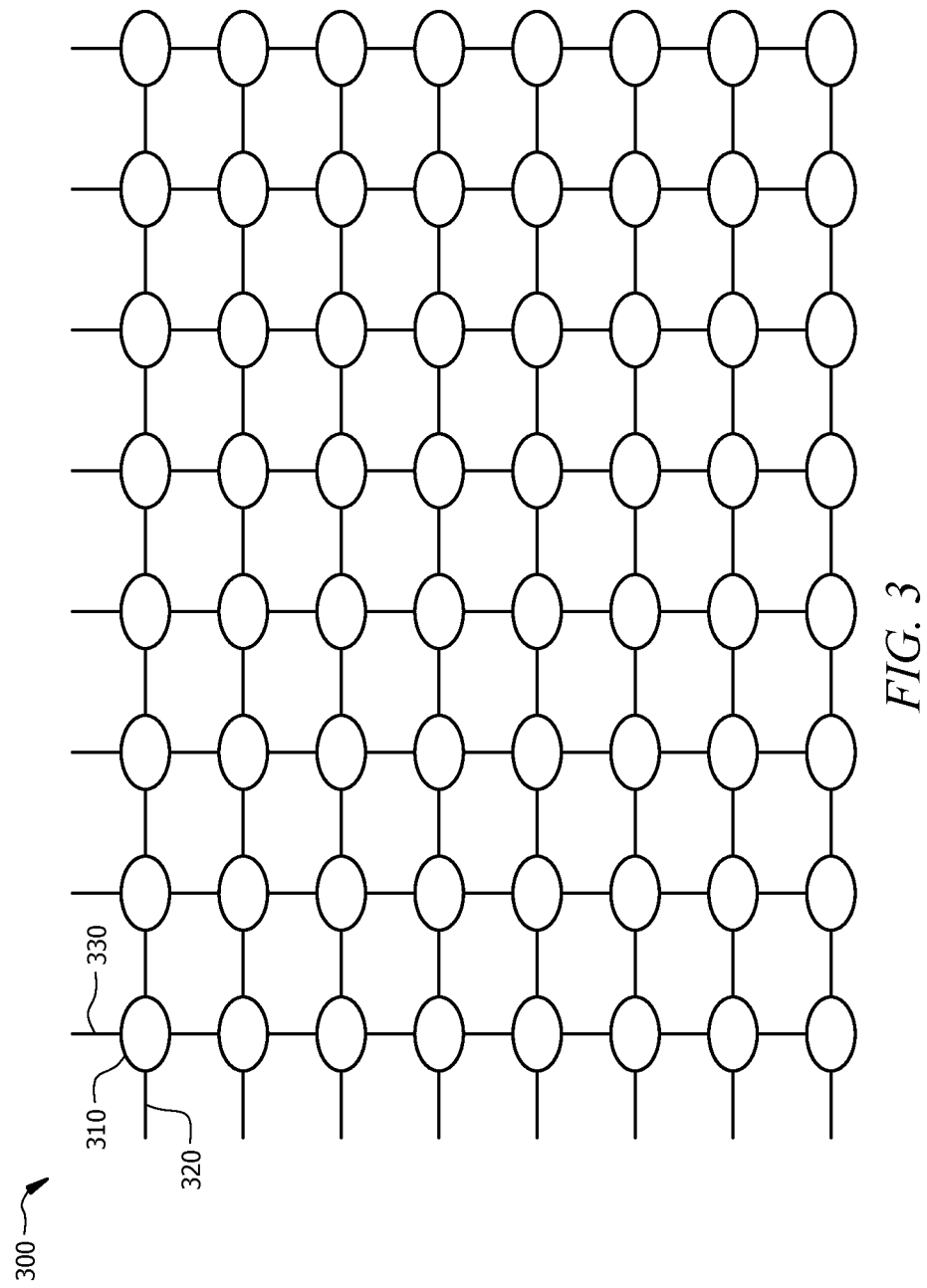
FIG. 3 is a schematic diagram of an 8×8 crossbar optical switch.

FIG. 3 is a schematic diagram of an 8×8 crossbar optical switch 300. The optical switch 300 comprises 64 cells 310, 8 inputs 320, and 8 outputs 330. The cells 310 have various sizes. Despite the simplicity of the crossbar optical switch 300, it provides fast path calculation, low insertion loss, and non-blocking, but suffers from path-dependent insertion loss, high crosstalk, medium cell count, and inflexibility.

Figure 4:
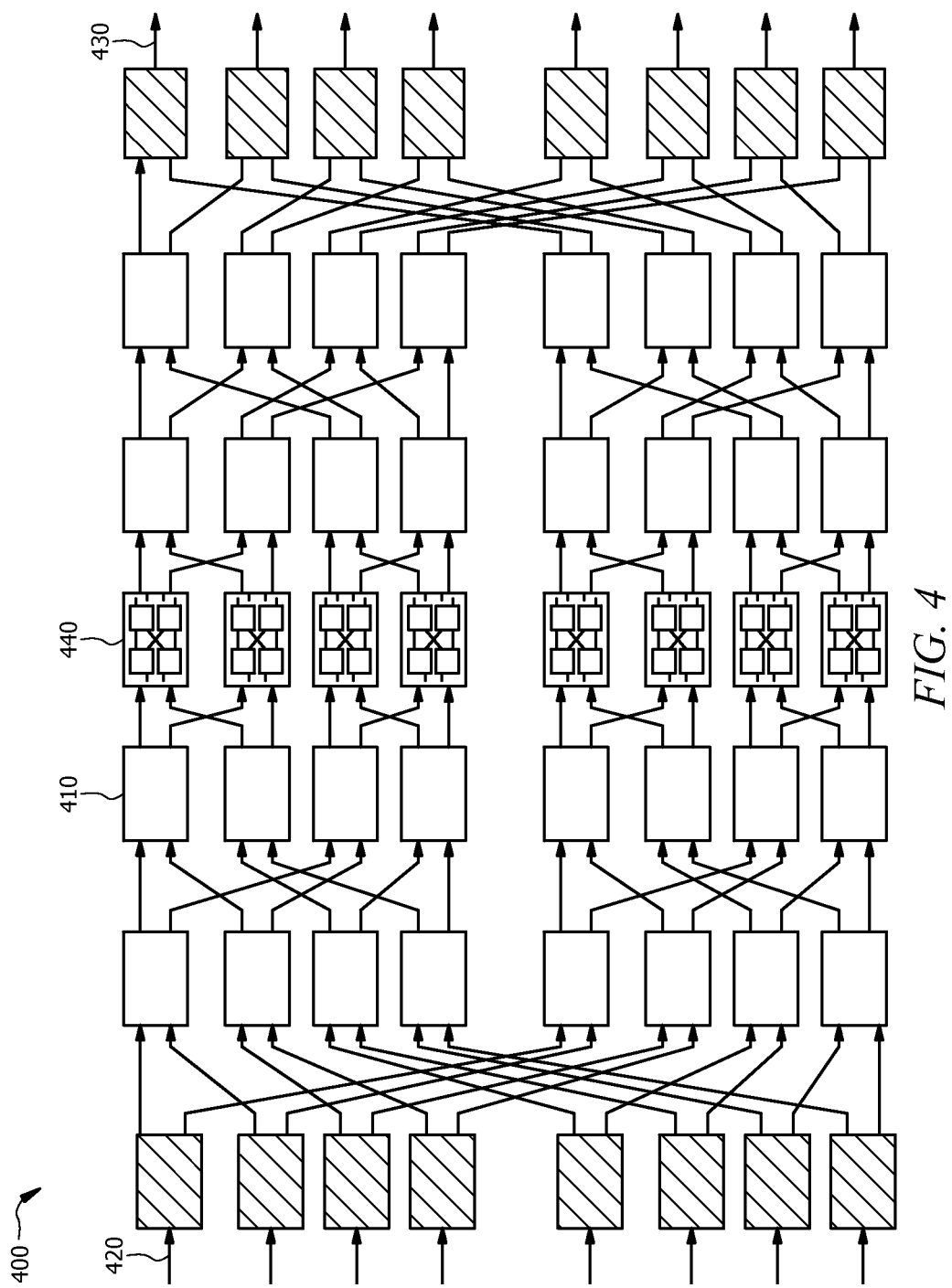
FIG. 4 is a schematic diagram of an 8×8 hybrid dilated Benes enhanced (HDBE) optical switch.

FIG. 4 is a schematic diagram of an 8×8 HDBE optical switch 400. The optical switch 400 comprises 48 cells 410, 8 inputs 420, 8 enhanced dilated banyan (EDB) cells 440, and 8 outputs 430. The cells 410 comprise 1×2 cells, 2×2 cells, and 2×1 cells. The EDB cells 440 comprise 2 1×2 cells and 2 2×1 cells. The architecture of the optical switch 400 provides a low cell count that enables the optical switch 400 to be scalable, low to medium levels of crosstalk, and low insertion loss, but this architecture suffers from blocking, slow path calculation, and inflexibility.

Table 1 compares the seven criteria above for the optical switch 100, the optical switch 200, the optical switch 300, and the optical switch 400. In Table 1, fully loaded means that all the paths connecting the inputs and the outputs are established. Synchronous means that packets enter the inputs at the same time. Asynchronous means that packets enter the inputs at different times.

TABLE 1

Comparison of Optical Switch Criteria

|  |  | Optical Switch 100 | Optical Switch 200 | Optical Switch 300 | Optical Switch 400 |
|---|---|---|---|---|---|
| Cell Count | 16 × 16 | 480 | 288 | 256 | 192 |
|  | 32 × 32 | 1984 | 1216 | 1024 | 448 |
|  | 64 × 64 | 8064 | 4992 | 4096 | 1024 |
|  | N × N | $2N(N-1)$ | $1.25 \times N^2 - 2N$ | $N^2$ | $2N(\log(2,N) + 2)$ |
| Number of Cells in a Path |  | $2\log(2,N)$ | $2\log(2,N) - 1$ | 1 to $2N - 1$ (path dependent) | $2\log(2,N) + 2$ |
| Blocking Characteristics |  | Strict non-blocking | Strict non-blocking | Wide-sense non-blocking | Rearrangeable non-blocking |
| Blocking Rate with the Same Wavelength |  | 0 | 0 | 0 | Synchronous: 0 Asynchronous: max 1e−1 when fully loaded |
| Advantages |  | Low crosstalk, Low insertion loss, Fast route calculation, Non-blocking | Low insertion loss, Fast route calculation, Single chip for 16 × 16, Non-blocking | Fast route calculation, Low insertion loss, Non-blocking | Scalable (low cell count), Low to medium crosstalk, Low insertion loss, Single Chip |
| Disadvantages |  | Not scalable (high cell count), Multi-chip for 16 × 16, Not flexible | Medium crosstalk, Not scalable, Not flexible, | High crosstalk, Path-dependent loss, Medium cell count, Not flexible | Blocking, Slow route calculation, Not flexible |
| Compliance with 7 Requirements |  | 4 out of 7 | 4 out of 7 | 3 out of 7 | 4 out of 7 |

As can be seen from Table 1, none of the optical switches 100, 200, 300, and 400 meets all of the seven criteria. There is therefore a need for an optical switch that meets more of those criteria.

Disclosed herein are embodiments for optical switches that meet the aforementioned criteria better than the optical switches 100, 200, 300, and 400. Specifically, the optical switches provide a small cell count, low crosstalk, a short total delay, an acceptably low level of blocking, low insertion loss, a scalable architecture, and a flexible architecture. The optical switches may be either stand-alone optical switches or part of an HTC system, a data center system, a transponder aggregator, or another suitable system.

Figure 5:
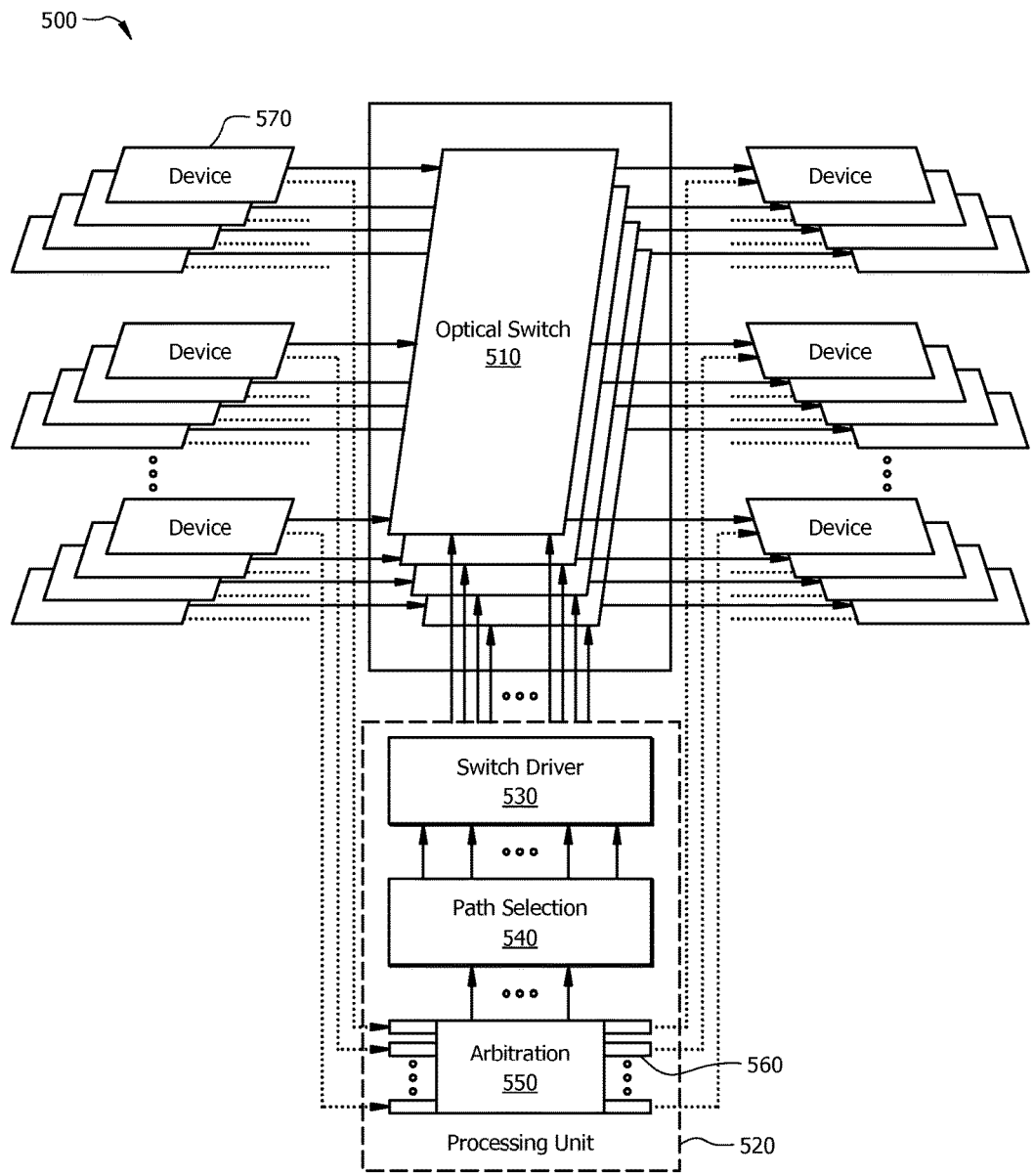
FIG. 5 is a schematic diagram of an HTC system according to an embodiment of the disclosure.

FIG. 5 is a schematic diagram of an HTC system 500 according to an embodiment of the disclosure. The system 500 comprises a bank of optical switches 510, a processing unit 520, and a plurality of devices 570. The system 500 may also comprise electrical-to-optical (EO) and optical-to-electrical (OE) components (not shown) to provide interaction among the other components. The components of the HTC system 500 may be arranged as shown or in any other suitable manner.

The optical switches 510 are any suitable optical switches. There may be any suitable number of optical switches 510 arranged in parallel. For instance, there may be four optical switches 510 as shown in FIG. 5. The optical switches 510 comprise an architecture described more fully below. The optical switches 510 may be based on lead zirconium titanate (PZT), silicon, or other suitable substrates.

The processing unit 520 is any suitable processor configured to control, and carry out instructions for, the optical switches 510. The processing unit 520 comprises a switch driver module 530, a path selection module 540, an arbitration module 550, and a plurality of serializers/deserializers (SerDeses) 560. The switch driver module 530 is any suitable high-speed analog current circuit configured to drive the optical switches 510. Drive may mean to provide current to or to logically control. The path selection module 540 finds paths between the input ports and output ports of the optical switches 510. In some embodiments, it may be implemented in a field-programmable gate array (FPGA) or application-specific integrated circuit (ASIC). The arbitration module 550 is any suitable processing module configured to form packet headers, implement data scheduling through the optical switches 510, control the optical switches 510, and perform request and grant signaling. The SerDeses 560 are any suitable devices configured to convert data between serial data interfaces and parallel data interfaces in each direction.

The devices 570 are any suitable electrical processors, memories, or both configured to communicate data among themselves via the optical switches 510. A suitable processor may be implemented by hardware or software and as one or more central processing unit (CPU) chips, cores, FPGAs, ASICs, or digital signal processors (DSPs). A suitable memory may be volatile or non-volatile and may be read-only memory (ROM), random-access memory (RAM), ternary content-addressable memory (TCAM), or static random-access memory (SRAM). Data from a first of the devices 570 is transmitted to a second of the devices 570 over optical channels and switched by the optical switches 510.

In operation, a first of the devices 570 communicates to the processing unit 520 a request to transmit a packet to a second of the devices 570. The arbitration module 550 schedules transmission of the packet, the path selection module 540 determines the best path to connect an input of the optical switches 510 to an output of the optical switches 510, and the switch driver module 530 drives the optical switch. The processing unit 520 instructs the first of the devices 570 which input of the optical switches 510 to transmit to, instructs the optical switches 510 to use the best path to switch the packet to an output, and instructs the second of the devices 570 which output of the optical switches 510 to receive from. Finally, the first of the devices 570 transmits the packet to the optical switches 510, the optical switches 510 route the packet via the best path, and the second of the devices 570 receives the packet from the optical switches 510. The communication to and from the processing unit 520 occurs through the SerDeses 560.

Figure 6:
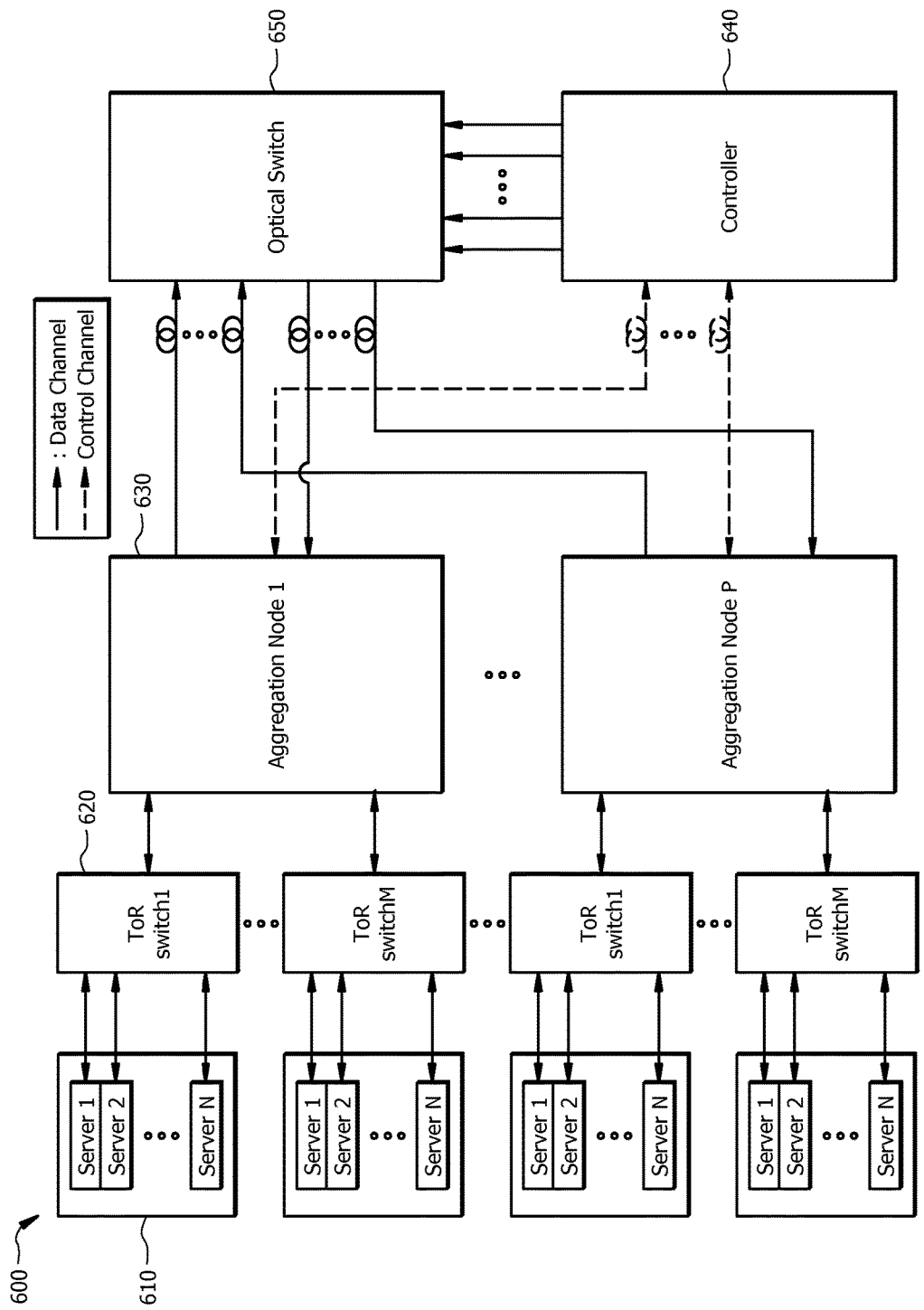
FIG. 6 is a schematic diagram of a data center system according to an embodiment of the disclosure.

FIG. 6 is a schematic diagram of a data center system 600 according to an embodiment of the disclosure. The system 600 comprises servers 610, top-of-rack (ToR) switches 620, aggregation nodes 630, a controller 640, and an optical switch 650. The components of the system 600 may be arranged as shown or in any other suitable manner.

The servers 610 are any suitable servers configured to store data and share that data with other devices, including the ToR switches 620. N servers 610 are coupled to each ToR switch 620. N is any positive integer.

The ToR switches 620 are any suitable switches configured to combine packet streams from the servers 610 and other peripherals into a smaller number of high-speed streams and to distribute packet streams to the servers 610 and other peripherals. M ToR switches 620 are coupled to each aggregation node 630. M is any positive integer.

The aggregation nodes 630 are any suitable nodes configured to implement scheduling, photonic frame wrapping, and photonic frame unwrapping. P aggregation nodes 630 are coupled to the controller 640 and the optical switch 650. P is any positive integer.

The controller 640 is any suitable controller configured to implement synchronization and signaling and to control the optical switch 650 using control signals. The controller 640 may be an FPGA. The optical switch 650 is any suitable optical switch configured to perform packet switching. The optical switch 650 comprises an architecture described more fully below. The optical switch 650 may be based on PZT, silicon or other suitable substrates.

In operation, a first plurality of the servers 610 transmits packet streams to a first ToR switch 620. The first ToR switch 620 combines the packet streams into a high-speed stream and transmits the high-speed stream to a first aggregation node 630. The first aggregation node 630 performs photonic wrapping of the packets in the high-speed stream to produce a wrapped photonic frame and communicates to the controller 640 a desire to transmit the wrapped photonic frame to the optical switch 650. Photonic frame wrapping is described in U.S. Patent App. Pub. No. 2014/0334819 titled "System and Method for Photonic Switching," which is incorporated by reference. The controller 640 schedules the transmission of the wrapped photonic frame, instructs the first aggregation node 630 which input port of the optical switch 650 to transmit to, and instructs the optical switch 650 which output port to transmit the wrapped photonic frame from. The first aggregation node 630 then transmits the wrapped photonic frame to the optical switch 650, the optical switch 650 switches the wrapped photonic frame, and the optical switch 650 transmits the wrapped photonic frame to a second aggregation node 630. The second aggregation node 630 receives the wrapped photonic frame, un-wraps the wrapped photonic frame to produce a high-speed stream, and transmits the high-speed stream to a second ToR switch 620. The second ToR switch 620 receives the high-speed stream, splits the high-speed stream into packet streams, and transmits the packet streams to a second plurality of the servers 610. Finally, the second plurality of the servers 610 processes the packet streams.

Figure 7:
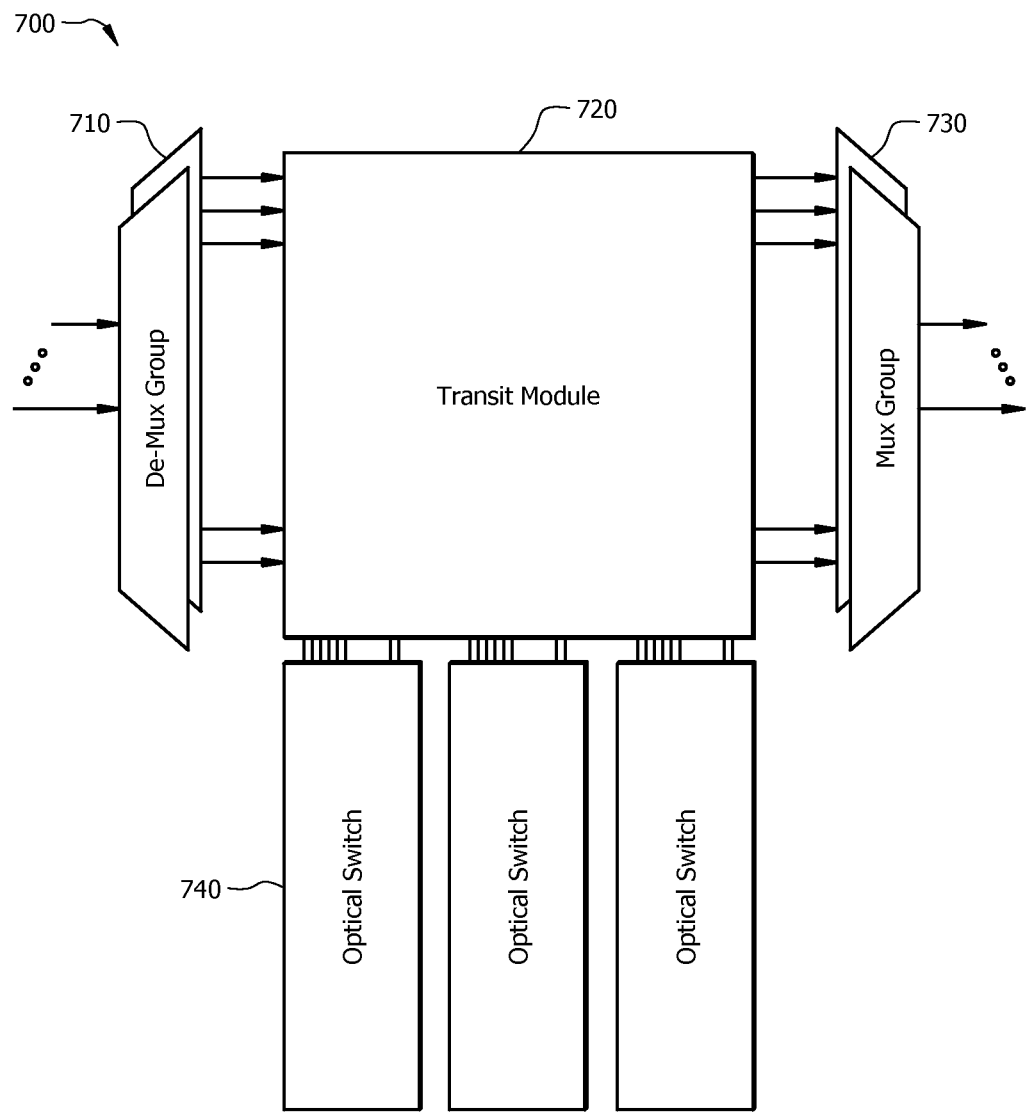
FIG. 7 is a schematic diagram of a transponder aggregator according to an embodiment of the disclosure.

FIG. 7 is a schematic diagram of a transponder aggregator 700 according to an embodiment of the disclosure. The transponder aggregator 700 may be used in optical transport networks and comprises a de-multiplexer (de-mux) group 710, a transit module 720, a multiplexer (mux) group 730, and a bank of optical switches 740. The components of the transponder aggregator 700 may be arranged as shown or in any other suitable manner.

The de-mux group 710 comprises any suitable de-muxes configured to split a single input signal into multiple output signals. The de-muxes may be arrayed waveguide gratings (AWGs). The transit module 720 is any suitable module configured to provide transmission paths that connect the de-mux group 710 to both the mux group 730 and the optical switches 740. The transit module 720 may comprise a plurality of optical switches interconnected with optical fibers or silicon waveguides. The mux group 730 comprises any suitable muxes configured to combine multiple input signals into a single output signal. The muxes may also be AWGs.

The optical switches 740 are any suitable optical switches configured to add and drop wavelength channels, which may correspond to optical paths. The optical switches 740 comprise an architecture described more fully below. The optical switches 740 may be PZT or silicon based.

In operation, an input optical signal enters a first de-mux of the de-mux group 710. The first de-mux splits the input optical signal into split input optical signals based on wavelength, then transmits the split input optical signals to the transit module 720. The optical switches 740 add and drop wavelength channels to provide optical paths for the split input optical signals to pass through the transit module 720. Alternatively, the split input optical signals pass directly through the transit module 720. The transit module 720 then routes the split input optical signals and transmits the split input optical signals to a first mux of the mux group 730. The first mux combines the split input optical signals into an output optical signal. Finally, the first mux forwards the output optical signal to another component or device for further processing.

Figure 8:
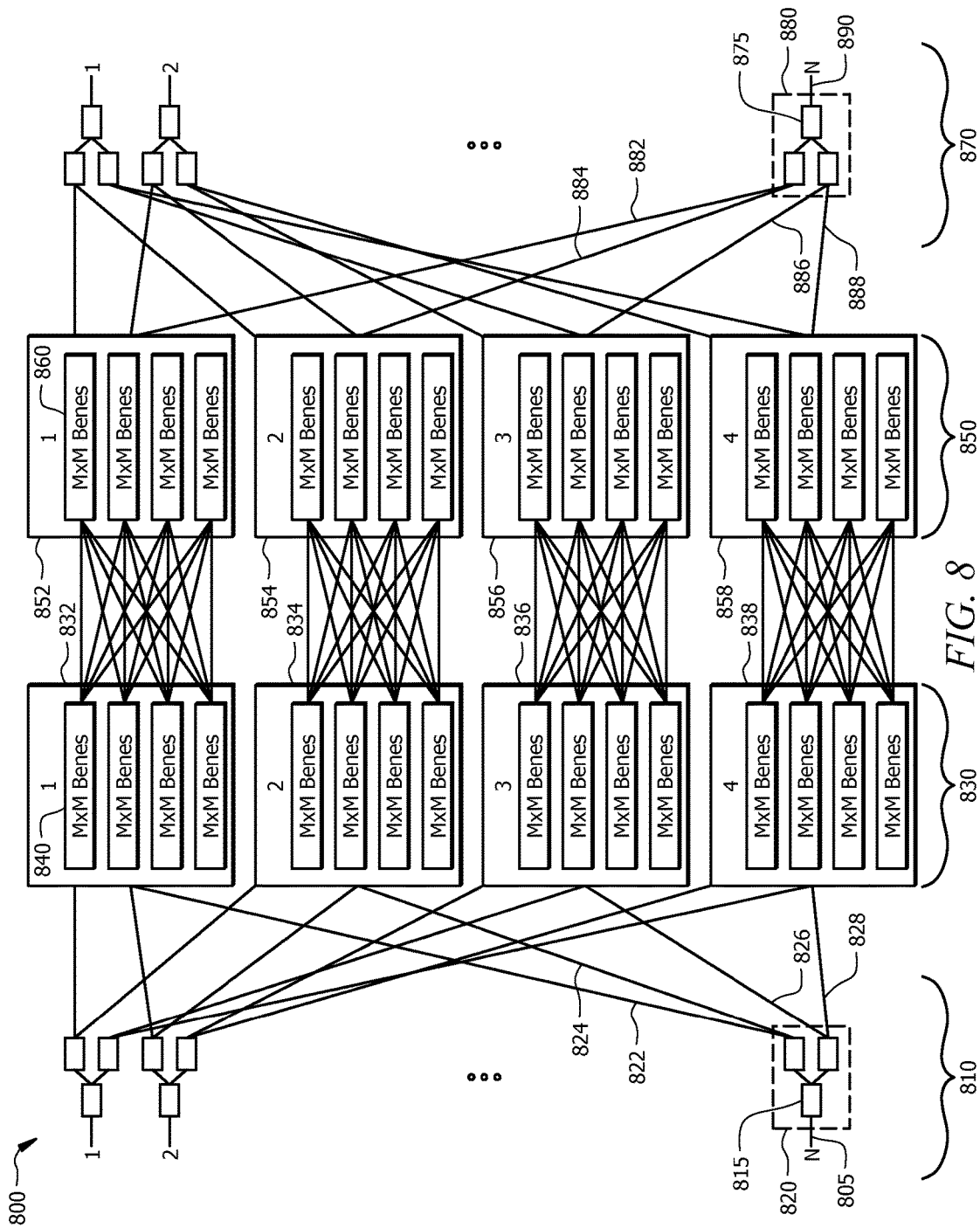
FIG. 8 is a schematic diagram of an N×N optical switch according to an embodiment of the disclosure.

FIG. 8 is a schematic diagram of an N×N optical switch 800 according to an embodiment of the disclosure. The optical switch 800 comprises N first inputs 805, a first stage 810, a second stage 830, a third stage 850, a fourth stage 870, and N fourth outputs 890N is a positive integer. In some embodiments, N is greater than 16 and is an integer power of 2. The components may be arranged as shown or in any other suitable manner.

The first stage 810 comprises N 1×4 first sub-switches 820. Each first sub-switch 820 comprises 1 first input 805; 3 1×2 first cells 815; and 4 first outputs 822, 824, 826, and 828. The first stage 810 therefore comprises N first inputs 805; 3N first cells 815; and 4N first outputs in total.

The second stage 830 comprises 4 second sections 832, 834, 836, and 838. Each second section 832, 834, 836, and 838 comprises 4 second sub-switches 840. Each second sub-switch 840 is an M×M Benes switch, which is described more fully below, and comprises M second inputs, a plurality of 2×2 second cells, M second outputs, and a structure described more fully below. M is an integer power of 2, is 4 or greater, and is equal to N/4. The second stage 830 therefore comprises 4N second inputs, a plurality of second cells, and 4N second outputs.

The first stage 810 and the second stage 830 are connected as follows: each of the 4 first outputs 822, 824, 826, and 828 of each first sub-switch 820 is connected to a second input from a different second section 832, 834, 836, and 838 so that each first sub-switch 820 is connected to all of the second sections 832, 834, 836, and 838. For example, the first output 822 is connected to a second input of the second section 832, the first output 824 is connected to a second input of the second section 834, the first output 826 is connected to a second input of the second section 836, and the first output 828 is connected to a second input of the second section 838.

The third stage 850 comprises 4 third sections 852, 854, 856, and 858. Each third section 852, 854, 856, and 858 comprises 4 third sub-switches 860. Each third sub-switch 860 comprises an M×M Benes switch and comprises M third inputs, a plurality of 2×2 third cells, M third outputs, and a structure described more fully below. The third stage 850 therefore comprises 4N third inputs, a plurality of third cells, and 4N third outputs.

The second stage 830 and the third stage 850 are connected as follows: the second section 832 is connected to the third section 852, the second section 834 is connected to the third section 854, the second section 836 is connected to the third section 856, and the second section 838 is connected to the third section 858. Each of the second sections 832, 834, 836, and 838 is connected to its corresponding third section 852, 854, 856, and 858 in a fully-connected manner. Fully connected means that, for instance, each second sub-switch 840 in the first section 832 is connected to every third sub-switch 860 in the third section 852.

The fourth stage 870 comprises N 4×1 fourth sub-switches 880. Each fourth sub-switch 880 comprises 4 fourth inputs 882, 884, 886, and 888; 3 2×2 fourth cells 875; and 1 fourth output 890. The fourth stage 870 therefore comprises 4N fourth inputs 882, 884, 886, and 888; 3N fourth cells 875; and N fourth outputs 890 in total.

The third stage 850 and the fourth stage 870 are connected as follows: each of the 4 fourth inputs 882, 884, 886, and 888 of each fourth sub-switch 880 is connected to a third output from a different third section 852, 854, 856, and 858 so that each fourth sub-switch 880 is connected to all of the third sections 852, 854, 856, and 858. For example, the fourth input 882 is connected to the third section 852, the fourth input 884 is connected to the third section 854, the fourth input 886 is connected to the third section 856, and the fourth input 888 is connected to the third section 858.

Figure 9:
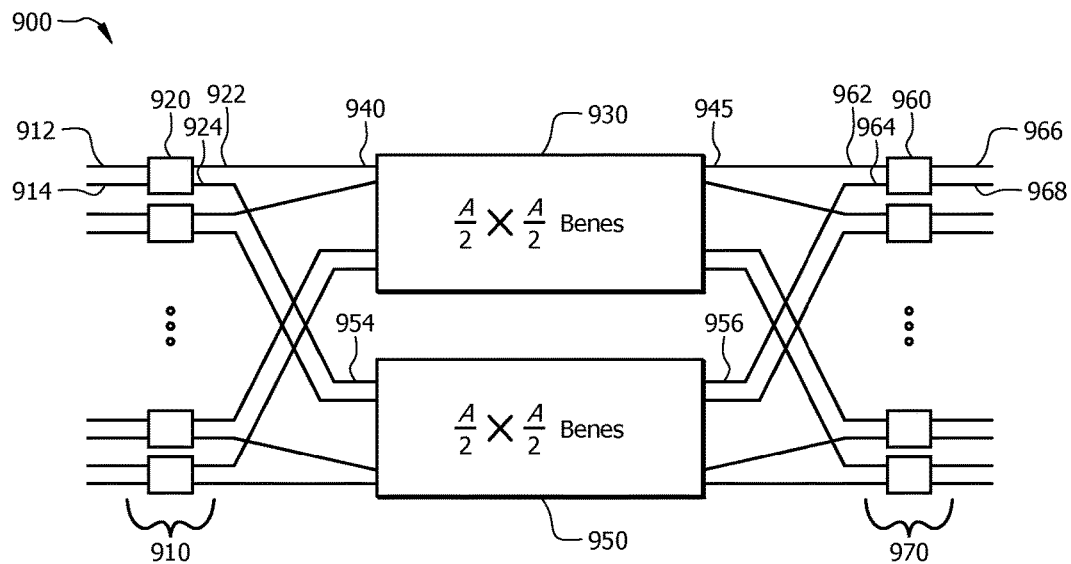
FIG. 9 is a schematic diagram of an A×A Benes switch.

FIG. 9 is a schematic diagram of an A×A Benes switch 900. The switch 900 may be any of the second sub-switches 840 or the third sub-switches 860 when M is greater than or equal to 4. The switch 900 comprises a first group of cells 910, a first Benes sub-switch 930, a second Benes sub-switch 950, and a second group of cells 970. A is a positive integer power of 2 and is 8 or greater. The components may be arranged as shown or in any other suitable manner.

The first group of cells 910 comprises $$\frac{A}{2}$$

first cells 920. Each first cell 920 is a 2×2 cell and comprises 2 first inputs 912 and 914 and 2 first outputs 922 and 924. The first group of cells 910 therefore comprises A first inputs 912 and 914, $$\frac{A}{2}$$

first cells 920, and A first outputs 922 and 924.

The first Benes sub-switch 930 is an $$\frac{A}{2} \times \frac{A}{2}$$

switch and comprises $$\frac{A}{2}$$

second inputs 940 and $$\frac{A}{2}$$

second outputs 945. The second Benes sub-switch 950 is an $$\frac{A}{2} \times \frac{A}{2}$$

switch and comprises $$\frac{A}{2}$$

second inputs 954 and $$\frac{A}{2}$$

second outputs 956. The first output 922 of each first cell 920 is connected to one of the second inputs 940 of the first Benes sub-switch 930, and the first output 924 of each first cell 920 is connected to one of the second inputs 954 of the second Benes sub-switch 950.

The third group of cells 970 comprises $$\frac{A}{2}$$

third cells 960. Each third cell 960 is a 2×2 cell and comprises 2 third inputs 962 and 964 and 2 third outputs 966 and 968. The third group of cells 970 therefore comprises A third inputs 962 and 964, $$\frac{A}{2}$$

third cells 960, and A third outputs 966 and 968. The third input 962 of each third cell 960 is connected to one of the second outputs 945 of the first Benes sub-switch 930, and the third input 964 of each third cell 960 is connected to one of the second outputs 956 of the second Benes sub-switch 950.

Figure 10:
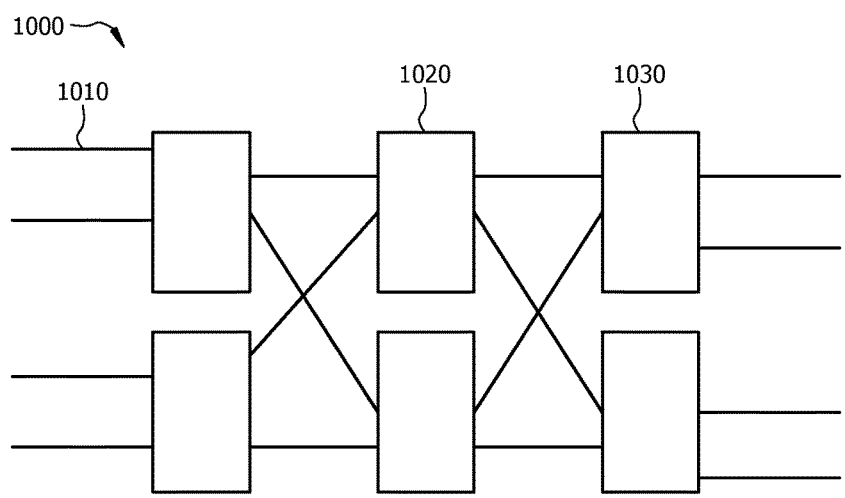
FIG. 10 is a schematic diagram of a 4×4 Benes switch.
Figure 11:
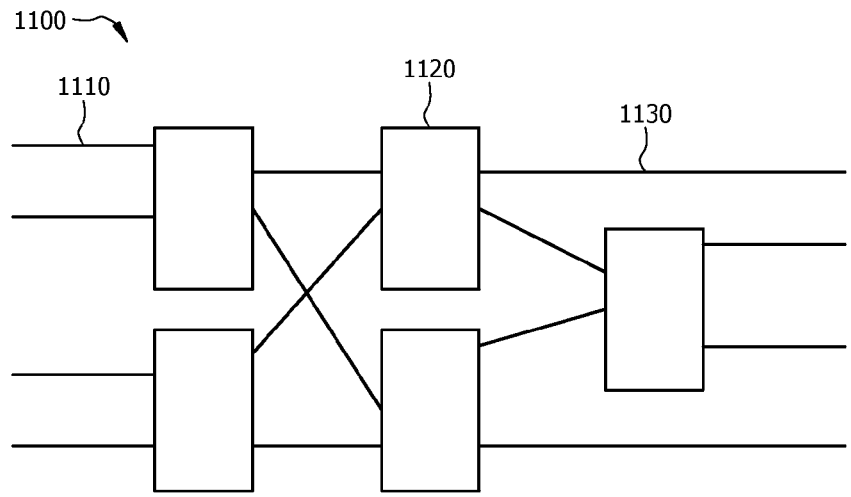
FIG. 11 is a schematic diagram of another 4×4 Benes switch.
Figure 12:
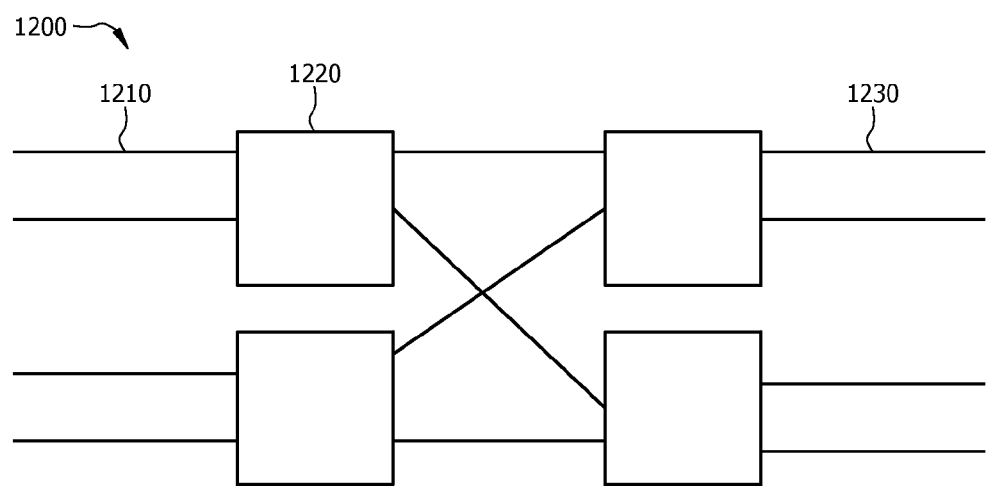
FIG. 12 is a schematic diagram of yet another 4×4 Benes switch.

FIGS. 10-12 illustrate three configurations for a 4×4 Benes switch. The configurations may be used for any of the second sub-switches 840 or the third sub-switches 860 when M is equal to 4. FIG. 10 is a schematic diagram of a 4×4 Benes switch 1000. The switch 1000 comprises 4 inputs 1010, 6 2×2 cells 1020, and 4 outputs 1030. FIG. 11 is a schematic diagram of another 4×4 Benes switch 1100. The switch 1100 comprises 4 inputs 1110, 5 2×2 cells 1120, and 4 outputs 1130. FIG. 12 is a schematic diagram of yet another 4×4 Benes switch 1200. The switch 1200 comprises 4 inputs 1210, 4 2×2 cells 1220, and 4 outputs 1230. As can be seen, the configurations differ in that the switch 1000 comprises 6 cells, the switch 1100 comprises 5 cells, and the switch 1200 comprises 4 cells.

Figure 13:
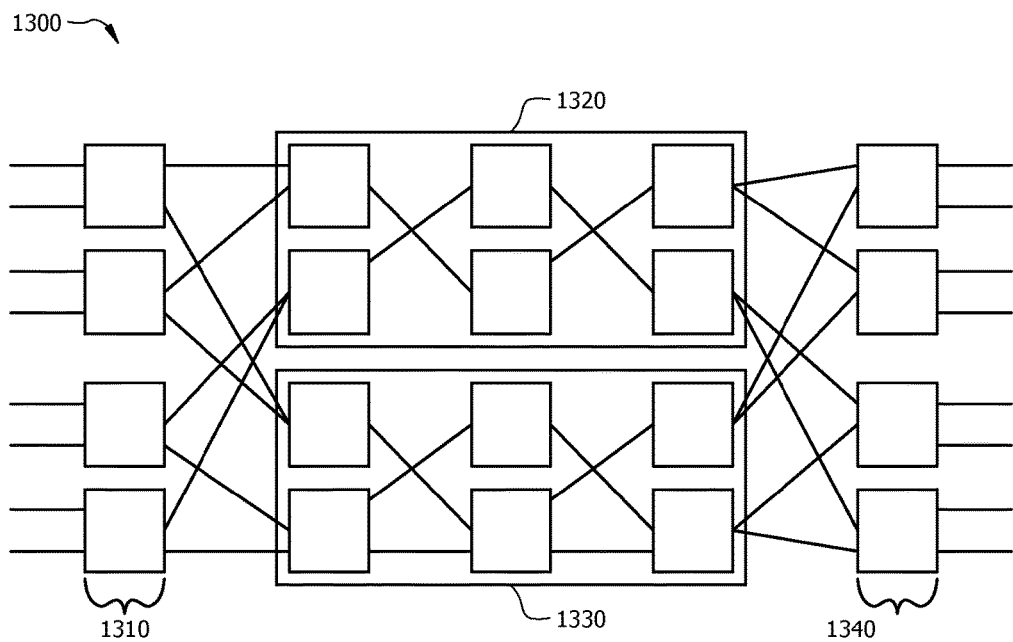
FIG. 13 is a schematic diagram of an 8×8 Benes switch.

FIG. 13 is a schematic diagram of an 8×8 Benes switch 1300. The switch 1300 may be any of the second sub-switches 840 or the third sub-switches 860 when M is equal to 8. The switch 1300 comprises a first group of cells 1310, a first Benes sub-switch 1320, a second Benes sub-switch 1330, and a second group of cells 1340. The first group of cells 1310 comprises 8 first inputs, 4 2×2 cells, and 8 first outputs. The first Benes sub-switch 1320 and the second Benes sub-switch 1330 may both be the switch 1000. The second group of cells 1340 comprises 8 second inputs, 4 2×2 cells, and 8 second outputs. The switch 1300 therefore comprises 8 inputs, 20 2×2 cells, and 8 outputs.

Figure 14:
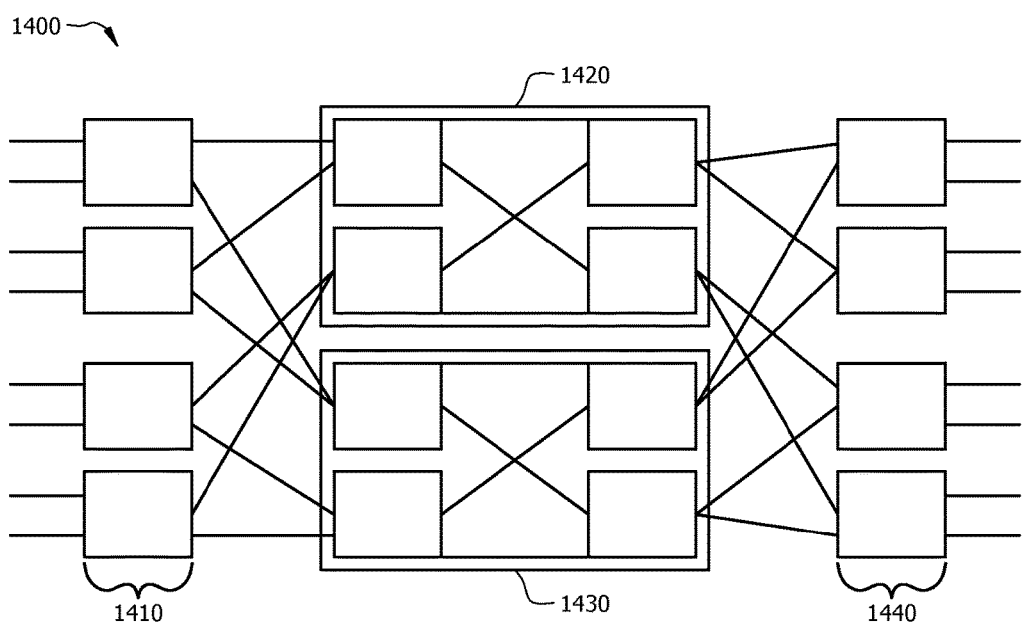
FIG. 14 is a schematic diagram of another 8×8 Benes switch.

FIG. 14 is a schematic diagram of another 8×8 Benes switch 1400. The switch 1400 may be any of the second sub-switches 840 or the third sub-switches 860 when M is equal to 8. The switch 1400 comprises a first group of cells 1410, a first 4×4 Benes sub-switch 1420, a second 4×4 Benes sub-switch 1430, and a second group of cells 1440. Unlike for the switch 1300, the first Benes sub-switch 1420 and the second Benes sub-switch 1430 in the switch 1400 may both be the switch 1200. The switch 1400 therefore comprises 8 inputs, 16 2×2 cells, and 8 outputs.

Returning to FIG. 8, the second sub-switch 840 comprises $(M/4)n_1 - 2M + M \log_2(M)$ 2×2 cells when the second sub-switch 840 comprises $n_1$ 2×2 cells. For example, if the second sub-switch is the 4×4 Benes switch 1000, then $n_1$ is equal to 6 because the switch 1000 comprises 6 2×2 cells. Similarly, the third sub-switch 860 comprises $(M/4) n_2 - 2M + M \log_2(M)$ cells when the third sub-switch 860 comprises $n_2$ 2×2 cells. For example, if the third sub-switch 860 is the 4×4 Benes switch 1100, then $n_2$ is equal to 5 because the switch 1100 comprises 5 2×2 cells. Because the second stage 830 comprises 16 second sub-switches 840, the second stage 830 comprises $4N \log_2(N) + (n_1 - 16)N$ cells in total. Similarly, the third stage 850 comprises $4N \log_2(N) + (n_2 - 16)N$ cells in total. Finally, adding the total number of cells for the second stage 830 and the third stage 850, as well as the first stage 810 and the fourth stage 870, the optical switch 800 comprises $8N \log_2(N) + (n_1 + n_2 - 26)N$ cells in total.

To provide fast packet switching, each cell in an optical switch 800 needs, on average, 5.5 electrical wires for each Mach-Zehnder interferometer (MZI) switching cell building block. The electrical wires provide drive current, photodiode monitors, and grounds, so the total number of wire-bonds for the optical switch 800 is $5.5N(n_1+n_2-26)+44N \log_2(N)$. For example, when both $n_1$ and $n_2$ are equal to 6, the cells total $8N \log_2(N) - 14N$ and the wire-bonds total $44N \log_2(N) - 77N$. When both $n_1$ and $n_2$ are equal to 4, the cells total $8N \log_2(N) - 18N$, and the wire-bonds total $44N \log_2(N) - 99N$.

Figure 15:
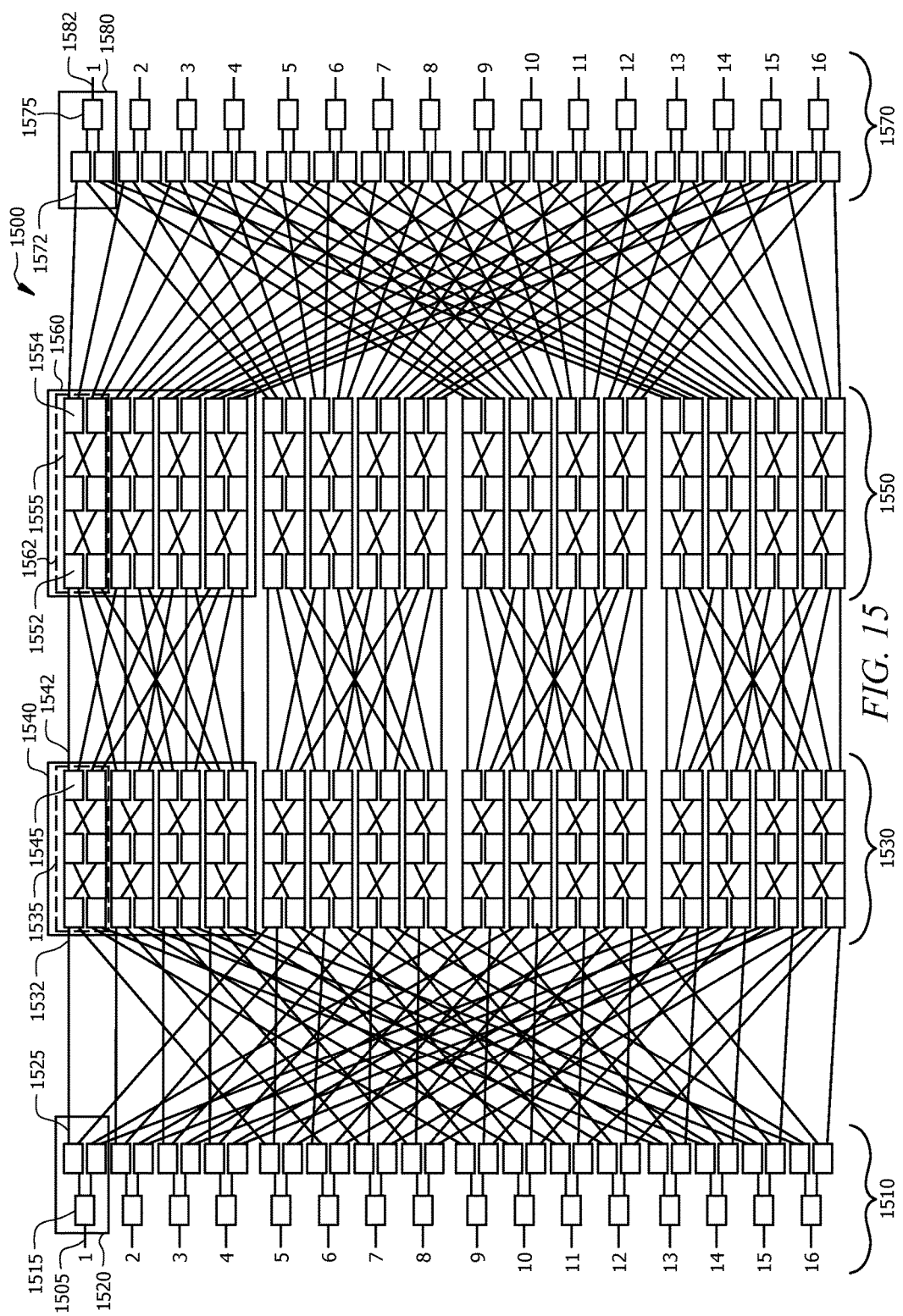
FIG. 15 is a schematic diagram of a 16×16 optical switch according to an embodiment of the disclosure.

FIG. 15 is a schematic diagram of a 16×16 optical switch 1500 according to an embodiment of the disclosure. The optical switch 1500 is similar to the optical switch 800, but the optical switch 1500 is for the specific case where N is equal to 16. The optical switch 1500 comprises a first stage 1510, a second stage 1530, a third stage 1550, and a fourth stage 1570, which are connected to each other in the same manner as the first stage 810, the second stage 830, the third stage 850, and the fourth stage 870 of the optical switch 800 in FIG. 8. The components may be arranged as shown or in any other suitable manner.

The first stage 1510 comprises 16 1×4 first sub-switches 1520. Each first sub-switch 1520 comprises 1 first input 1505, 3 1×2 first cells 1515, and 4 first outputs 1525. The first stage 1510 therefore comprises 16 first inputs 1505, 48 first cells 1515, and 64 first outputs 1525 in total.

The second stage 1530 comprises 4 first sections 1540. Each first section 1540 comprises 4 second sub-switches 1535. The second sub-switches 1535 are the same as the 4×4 Benes switch 1000 in FIG. 10. Accordingly, each second sub-switch 1535 comprises 4 second inputs 1532, 6 2×2 second cells 1545, and 4 second outputs 1542. The second stage 1530 therefore comprises 64 second inputs 1532, 96 second cells 1545, and 64 second outputs 1542 in total.

The third stage 1550 comprises 4 third sections 1560. Each third section 1560 comprises 4 third sub-switches 1555. The third sub-switches 1555 are the same as the 4×4 Benes switch 1000 in FIG. 10. Accordingly, each third sub-switch 1555 comprises 4 third inputs 1552, 6 2×2 third cells 1554, and 4 third outputs 1562. The third stage 1550 therefore comprises 64 third inputs 1552, 96 2×2 third cells 1554, and 64 third outputs 1562 in total.

The fourth stage 1570 comprises 16 4×1 fourth sub-switches 1580. Each fourth sub-switch 1580 comprises 4 fourth inputs 1572, 3 2×2 fourth cells 1575, and 1 fourth output 1582. The fourth stage 1570 therefore comprises 64 fourth inputs 1572, 48 fourth cells 1575, and 16 fourth outputs 1582 in total.

The optical switch 1500 therefore comprises 16 inputs, 288 cells, and 16 outputs in total. The optical switch 1500 meets all the seven criteria above. Specifically, the optical switch 1500 comprises less than 289 cells and exhibits the following:

1. less than −25 decibels (dB) of crosstalk (when only one signal is passed through each 2×2 cell, overall crosstalk is substantially less and first-order crosstalk is substantially eliminated);
2. insertion loss of 20 dB or less;
3. flexibility in adding or removing the number of cells in a given path;
4. no blocking or an acceptable level of blocking;
5. a scalable architecture; and
6. a fast routing algorithm that enables less than 200 nanoseconds (ns) of total delay, which comprises request processing, path finding, grant issuing, switch configuration, and switching speed, the latter of which is less than 10 ns.

Figure 16:
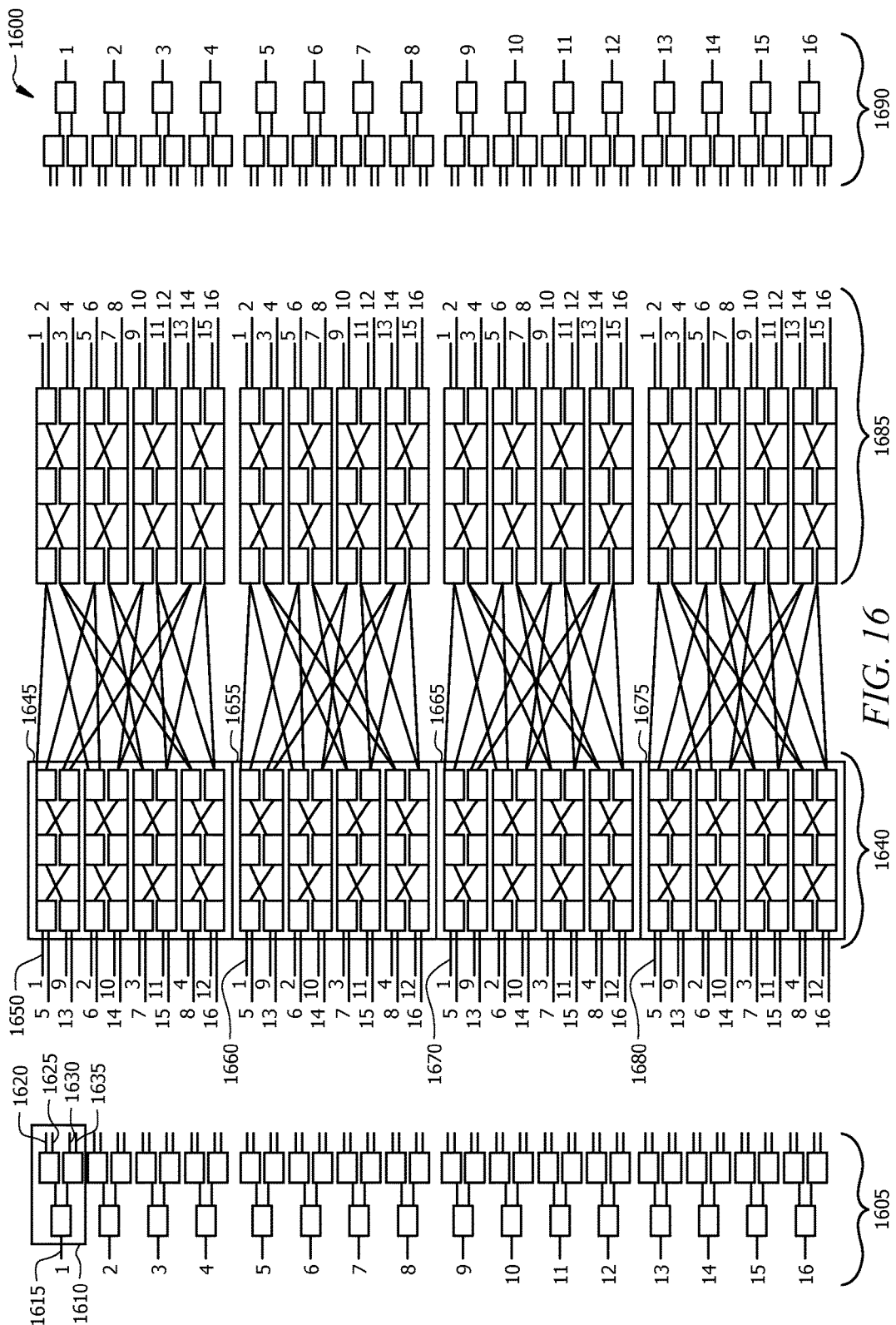
FIG. 16 is a schematic diagram of a 16×16 optical switch according to another embodiment of the disclosure.

FIG. 16 is a schematic diagram of a 16×16 optical switch 1600 according to another embodiment of the disclosure. The optical switch 1600 is the same as the optical switch 1500 in FIG. 15, but the optical switch 1600 is re-numbered in order to demonstrate the connections between stages. The optical switch 1600 comprises a first stage 1605, a second stage 1640, a third stage 1685, and a fourth stage 1690.

The first stage 1605 comprises a first sub-switch 1610. The first sub-switch 1610 comprises 1 first input 1615 labeled 1 and 4 first outputs 1620, 1625, 1630, and 1635.

The second stage 1640 comprises a second section 1645 comprising a second input 1650 labeled 1, a second section 1655 comprising a second input 1660 labeled 1, a second section 1665 comprising a second input 1670 labeled 1, and a second section 1675 comprising a second input 1680 labeled 1. Because the first sub-switch 1610 comprises the first input 1615 labeled 1, the first outputs 1620, 1625, 1630, and 1635 of the first sub-switch 1610 connect to the second inputs 1650, 1660, 1670, and 1680, respectively, which are also labeled 1. The remaining sub-switches in the first stage 1605 are similarly connected to the second sections 1645, 1655, 1665, and 1675 by respective label numbers. The third stage 1685 and the fourth stage 1690 are connected in a similar manner, and the second stage 1640 and the third stage 1685 are connected to each other in the same manner as the second stage 830 and the third stage 850 of the optical switch 800 in FIG. 8.

Figure 17:
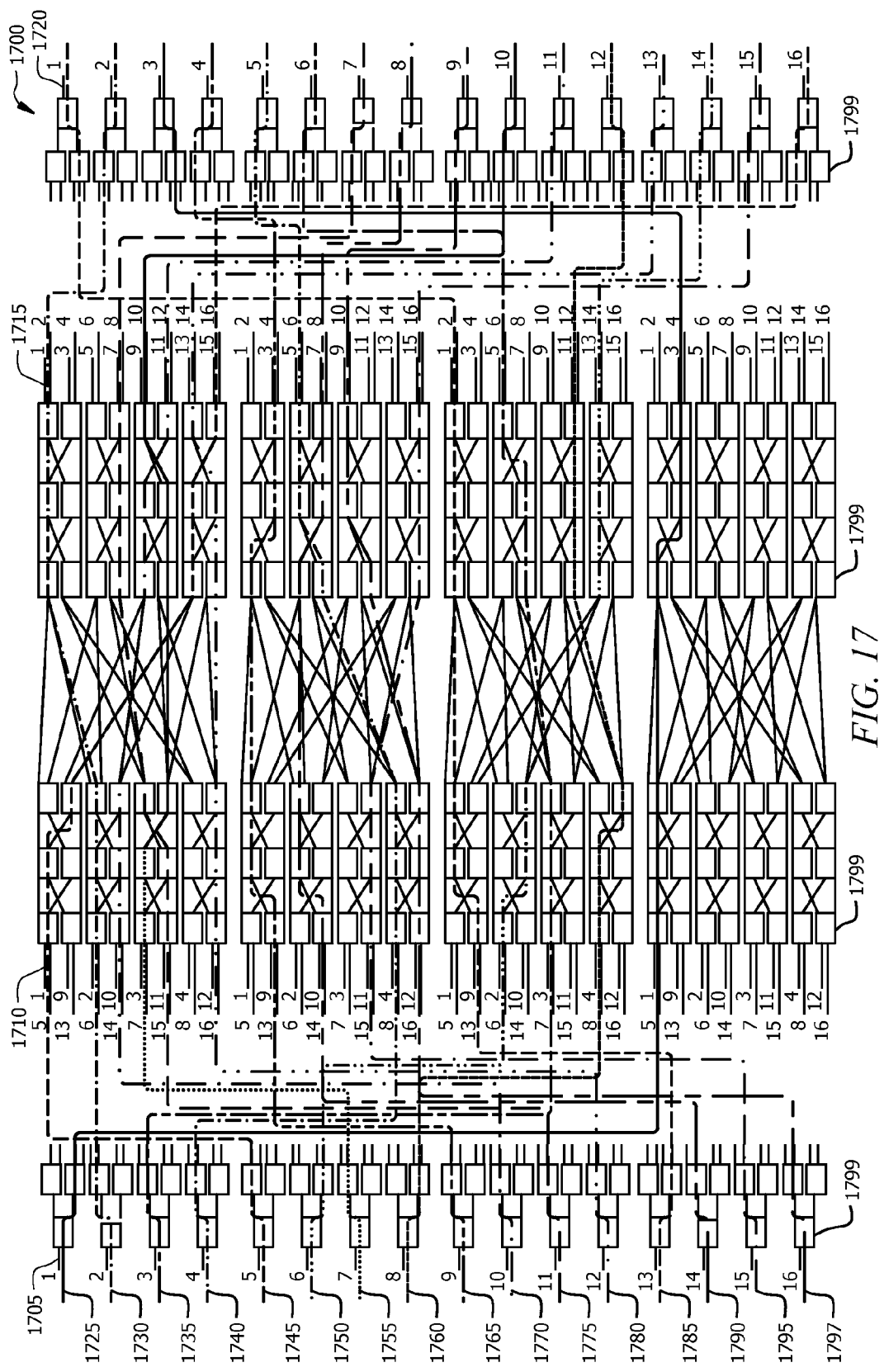
FIG. 17 is a schematic diagram of a 16×16 optical switch according to yet another embodiment of the disclosure.

FIG. 17 is a schematic diagram of a 16×16 optical switch 1700 according to yet another embodiment of the disclosure. The optical switch 1700 is the same as the optical switch 1500 in FIG. 15, but the optical switch 1700 is illustrated in order to demonstrate packet routing. The optical switch 1700 comprises 16 first inputs 1705, second inputs 1710, third outputs 1715, and 16 fourth outputs 1720, which are labeled to denote connections as described above for the optical switch 1600 in FIG. 16.

The optical switch 1700 further comprises 16 packet paths 1725-1797 that pass through cells 1799. Although four cells 1799 are labeled 1799, the label 1799 applies to all of the cells in the optical switch 1700. A path selection module, for instance the path selection module 540, determines the paths 1725-1797 based on an order of packet arrival and a path-finding algorithm. The path algorithm may allow only one packet to pass through each of the cells 1799 at a time and is otherwise optimized to meet the seven criteria described above. Table 2 summarizes the resulting paths in order of their processing through the optical switch 1700.

TABLE 2

Paths 1725-1797 through the Optical Switch 1700

| Path | First Input Label | Fourth Output Label |
|------|-------------------|---------------------|
| 1775 | 11 | 7 |
| 1730 | 2 | 2 |
| 1765 | 9 | 4 |
| 1740 | 4 | 5 |
| 1735 | 3 | 6 |
| 1770 | 10 | 11 |
| 1745 | 5 | 16 |
| 1785 | 13 | 1 |
| 1725 | 1 | 3 |
| 1755 | 7 | 10 |
| 1780 | 12 | 13 |
| 1790 | 14 | 8 |
| 1797 | 16 | 9 |
| 1760 | 8 | 12 |
| 1795 | 15 | 15 |
| 1750 | 6 | 14 |

As shown in Table 2 and FIG. 17, only one packet passes through each cell 1799 at a time. In addition, many of the cells 1799 towards the bottom of the optical switch 1700 remain unused.

Figure 18:
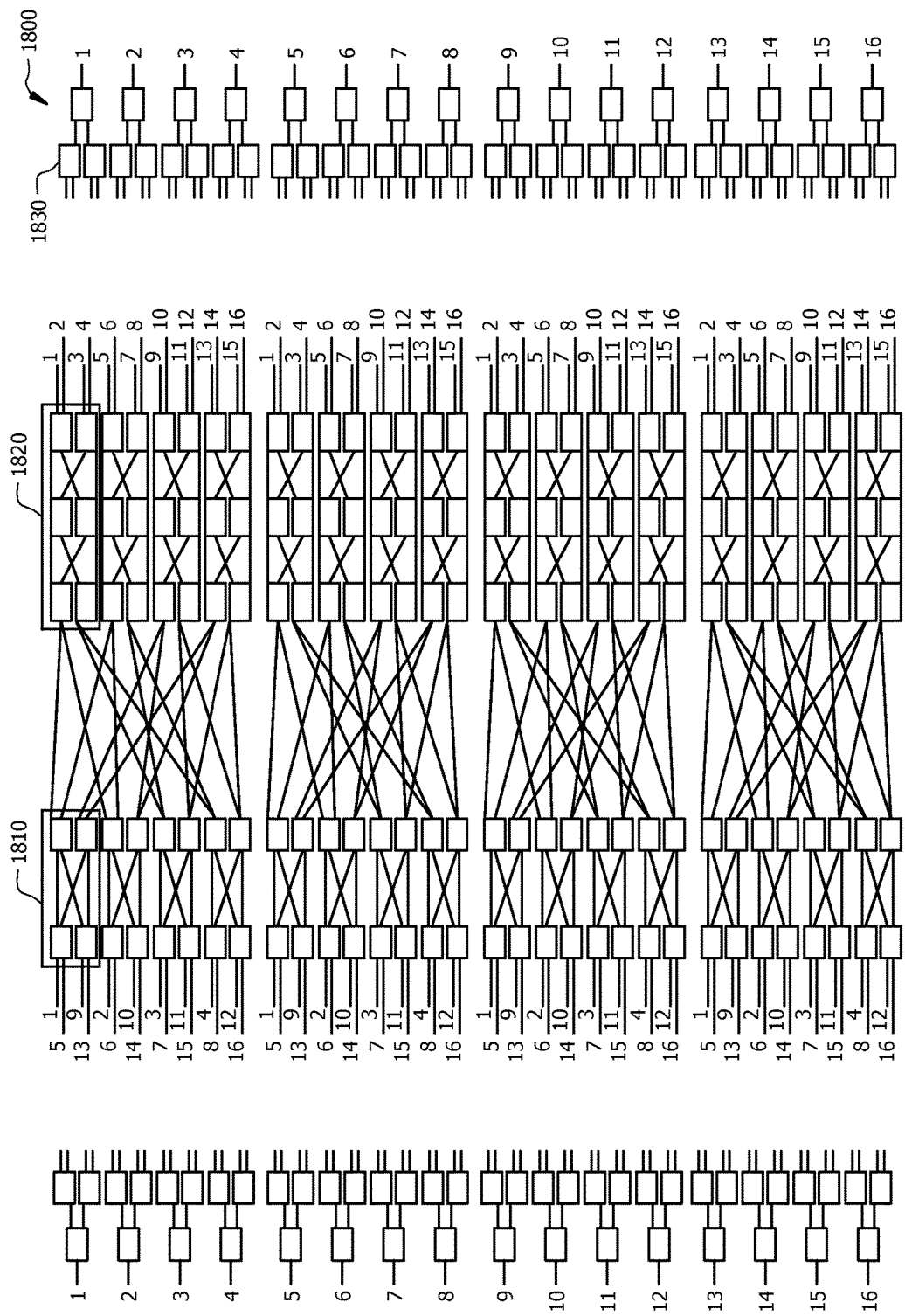
FIG. 18 is a schematic diagram of a 16×16 optical switch according to yet another embodiment of the disclosure.

FIG. 18 is a schematic diagram of a 16×16 optical switch 1800 according to yet another embodiment of the disclosure. The optical switch 1800 is similar to the optical switch 1500, except that the optical switch 1500 comprises second sub-switches 1535 that are the same as the 4×4 Benes switch 1000 in FIG. 10, while the optical switch 1800 comprises second sub-switches 1810 that are the same as the 4×4 Benes switch 1200 in FIG. 12. Like for the optical switch 1500, however, the optical switch 1800 comprises third sub-switches 1820 that are the same as the switch 1000 in FIG. 10. Because the switch 1000 comprises 6 cells and the switch 1200 comprises 4 cells, the optical switch 1500 comprises 288 cells, while the optical switch 1800 comprises 256 cells 1830.

Figure 19:
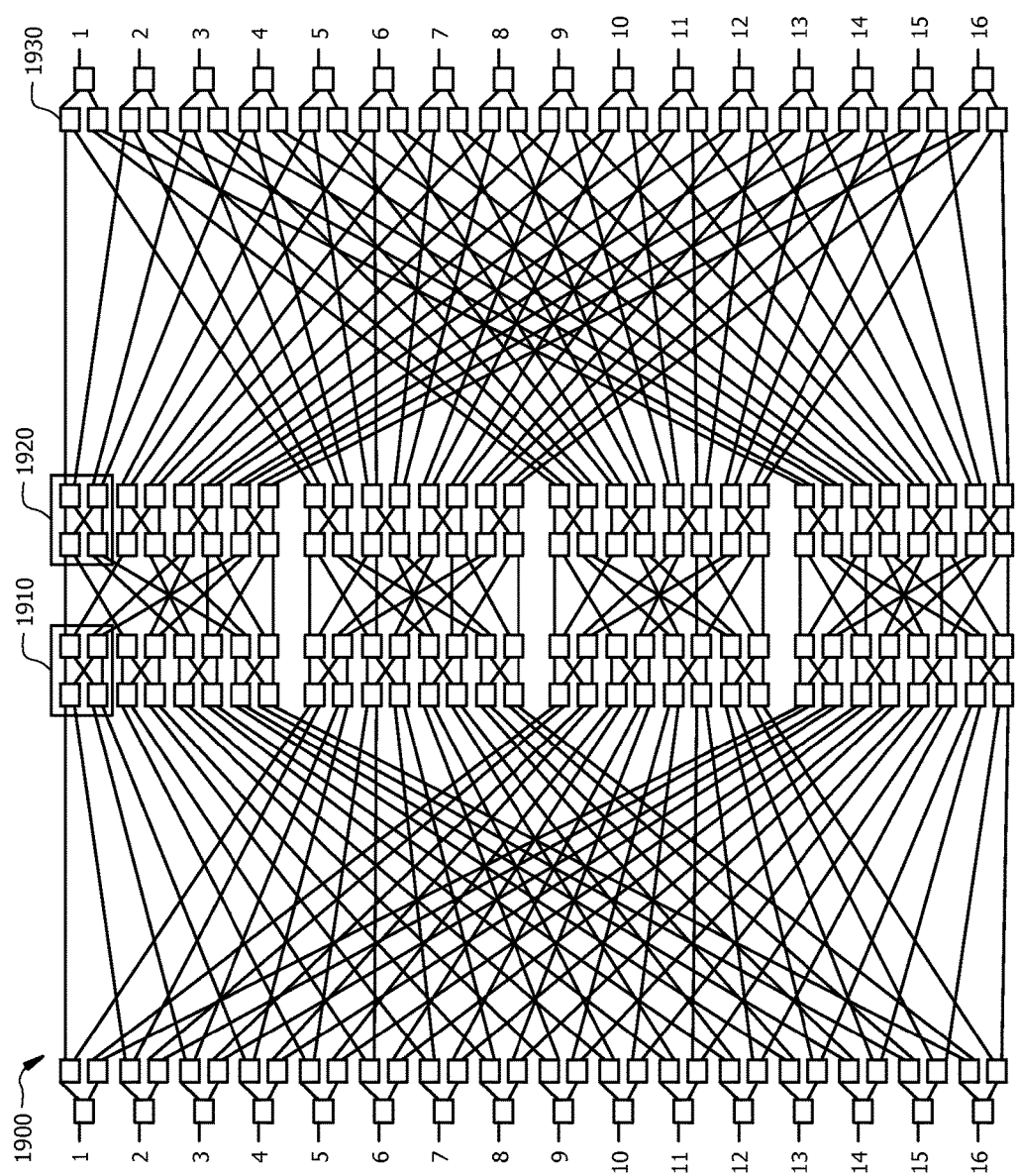
FIG. 19 is a schematic diagram of a 16×16 optical switch according to yet another embodiment of the disclosure.

FIG. 19 is a schematic diagram of a 16×16 optical switch 1900 according to yet another embodiment of the disclosure. The optical switch 1900 is similar to the optical switch 1500, except that the optical switch 1500 comprises second sub-switches 1535 and third sub-switches 1555 that are the same as the 4×4 Benes switch 1000 in FIG. 10, while the optical switch 1900 comprises second sub-switches 1910 and third sub-switches 1920 that are the same as the 4×4 Benes switch 1200 in FIG. 12. Because the switch 1000 comprises 6 cells and the switch 1200 comprises 4 cells, the optical switch 1500 comprises 288 cells, while the optical switch 1900 comprises 224 cells 1930.

When assuming 16 paths, the blocking rate of the optical switches 1500, 1800, and 1900 is defined as follows:

$$\text{Blocking rate} = \frac{\text{Total number of blocked paths}}{16 \times (\text{Total number of maps})}. \tag{1}$$

A map is an exhaustive listing of paths between inputs and outputs that can exist at any time. To minimize crosstalk, none of the paths should share any cells. In a simulation of 1 million maps for the optical switch 1500, 98.36% of the maps established all 16 paths while allowing only one packet to pass through a cell at a time; 1.6% of the maps established 15 paths while allowing only one packet to pass through a cell at a time, thus allowing 1 path where 2 packets share a cell; and 0.017% of the maps established 13 paths while allowing only one packet to pass through a cell at a time, thus allowing 2 paths where 2 packets share a cell. In the latter two scenarios, the cell sharing reduces blocking at the expense of slightly increased crosstalk. The resulting blocking rate in the simulation is only 0.1%. The same results are obtained for the optical switch 1800 and the optical switch 1900. Table 3 summarizes the blocking rates for the optical switch 1500, the optical switch 1800, and the optical switch 1900 for two cases. The first case is when either cell sharing or rearrangement is allowed, and the second case is when neither is allowed.

TABLE 3

Comparison of Optical Switch Blocking Rates

|  | Optical Switch 1500 | Hybrid Optical Switch | Optical Switch 1800 | Optical Switch 1900 |
|---|---|---|---|---|
| Cell Count | 288 | 272 | 256 | 224 |
| Wire-Bond Count | 1584 | 1496 | 1408 | 1232 |
| Blocking Rate (First Case) | Non-blocking | Non-blocking | Non-blocking | Non-blocking |
| Blocking Rate (Second Case) | 0.1% | 0.1% | 0.1% | 0.1% |
| Insertion Loss | 20 dB | Max 20 dB | 19 dB | 18 dB |

As shown, the optical switch 1500, the optical switch 1800, and the optical switch 1900 each exhibit non-blocking properties, despite having progressively reduced cell counts.

While not shown, the optical switch 1500, the optical switch 1800, and the optical switch 1900 also maintain low crosstalk, especially when two paths cannot share a cell. Table 3 also includes a hybrid optical switch, which employs the 4×4 Benes switch 1100 in a second stage and the 4×4 Benes switch 1000 in a third stage. The hybrid optical switch achieves results similar to the optical switch 1500, the optical switch 1800, and the optical switch 1900. By employing different 4×4 Benes switches, the optical switch 1500, the hybrid optical switch, the optical switch 1800, and the optical switch 1900 can vary cell counts and wire-bond counts, yet maintain good performance in terms of blocking rate, insertion loss, and crosstalk. The optical switch 1500, the hybrid optical switch, the optical switch 1800, and the optical switch 1900 therefore demonstrate flexibility in adding and dropping cells.

Figure 20:
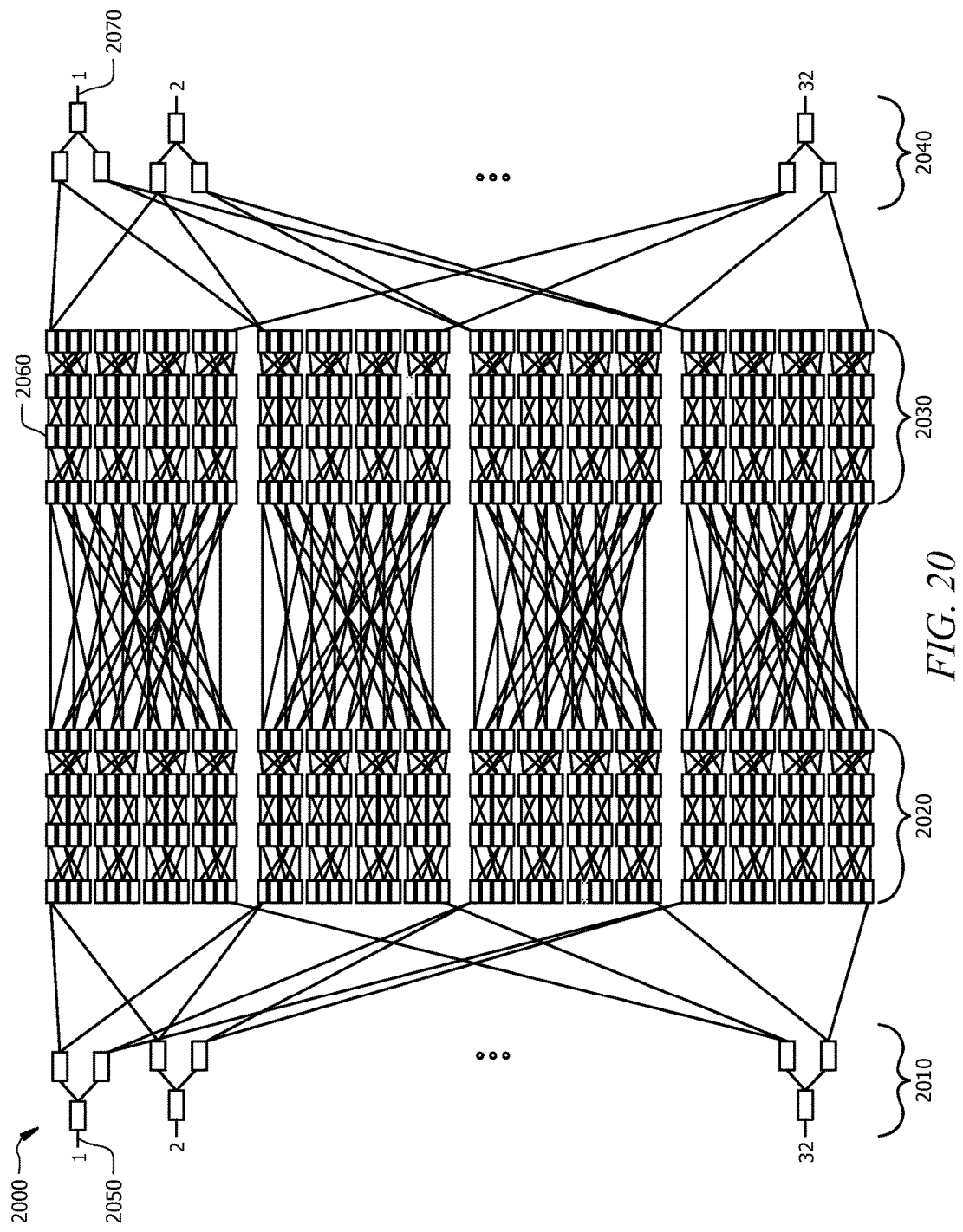
FIG. 20 is a schematic diagram of a 32×32 optical switch according to an embodiment of the disclosure.

FIG. 20 is a schematic diagram of a 32×32 optical switch 2000 according to an embodiment of the disclosure. The optical switch 2000 is similar to the optical switch 800, but the optical switch 2000 is for the specific case where N is equal to 32. The optical switch 2000 comprises a first stage 2010, a second stage 2020, a third stage 2030, and a fourth stage 2040, which are connected to each other in the same manner as the first stage 810, the second stage 830, the third stage 850, and the fourth stage 870 of the optical switch 800 in FIG. 8, as well as the same manner as the first stage 1510, the second stage 1530, the third stage 1550, and the fourth stage 1570 of the optical switch 1500 in FIG. 15. Unlike in the optical switch 800 and the optical switch 1500, the second stage 2020 and the third stage 2030 of the optical switch 2000 comprise 8×8 Benes switches. The optical switch 2000 therefore comprises 32 inputs 2050, 704 cells 2060, and 32 outputs 2070.

Figure 21:
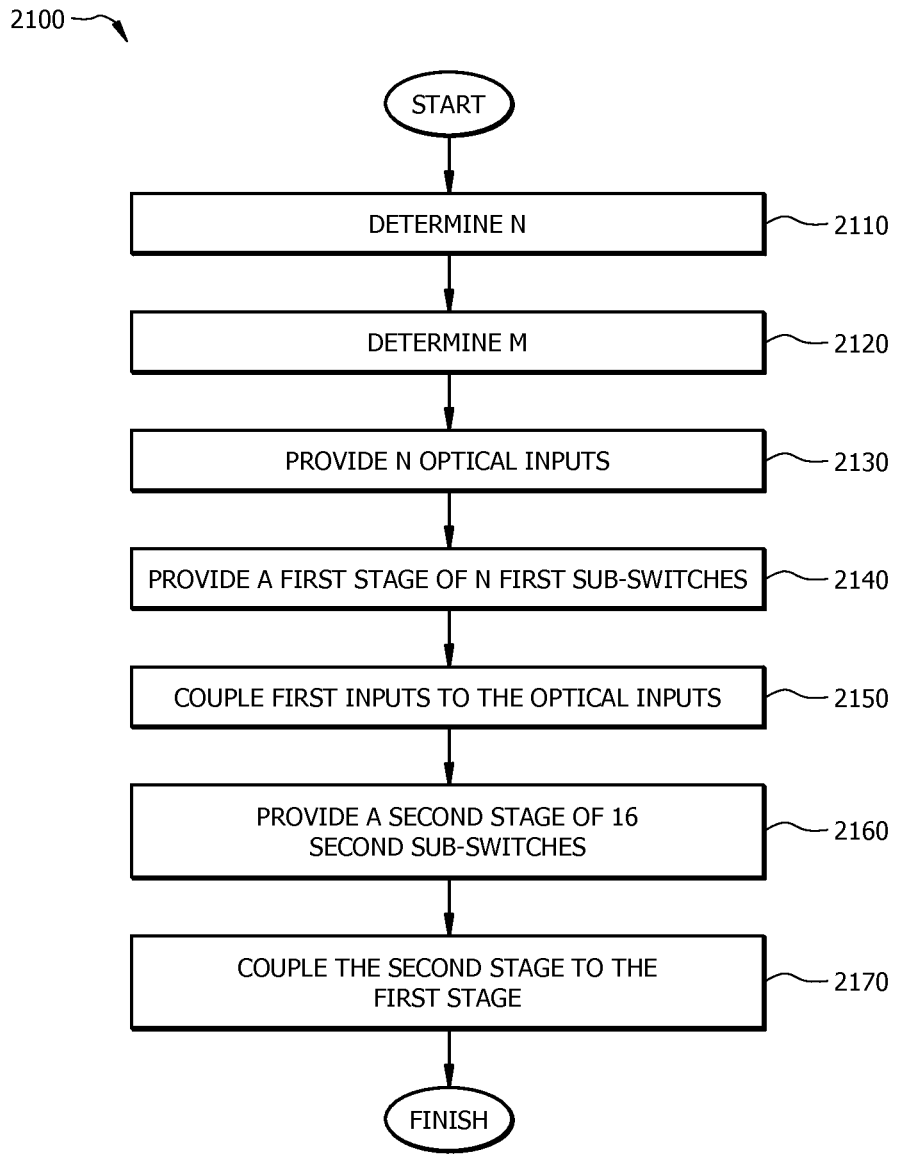
FIG. 21 is a flowchart illustrating a method of designing an optical switch according to an embodiment of the disclosure.

FIG. 21 is a flowchart illustrating a method 2100 of manufacturing an optical switch according to an embodiment of the disclosure. The method 2100 may be employed to manufacture, for instance, the optical switch 800, the optical switch 1500, and the optical switch 2000. At step 2110, N is determined. N is a positive integer, and in some embodiments is greater than 16 and is a power of 2.

At step 2120, M is determined. M is equal to N/4. At step 2130, N optical inputs are provided. At step 2140, a first stage of N first sub-switches is provided. For instance, the first stage is the first stage 810 and the first sub-switches are the first sub-switches 820. Each first sub-switch comprises 1 first input and 4 first outputs. For instance, the first inputs are the first inputs 805 and the first outputs are the first outputs 822, 824, 826, and 828. At step 2150, the first inputs are coupled to the optical inputs.

At step 2160, a second stage of 16 second sub-switches is provided. For instance, the second stage is the second stage 830 and the second sub-switches are the second sub-switches 840. Each second sub-switch comprises M second inputs and M second outputs. Finally, at step 2170, the second stage is coupled to the first stage.

Figure 22:
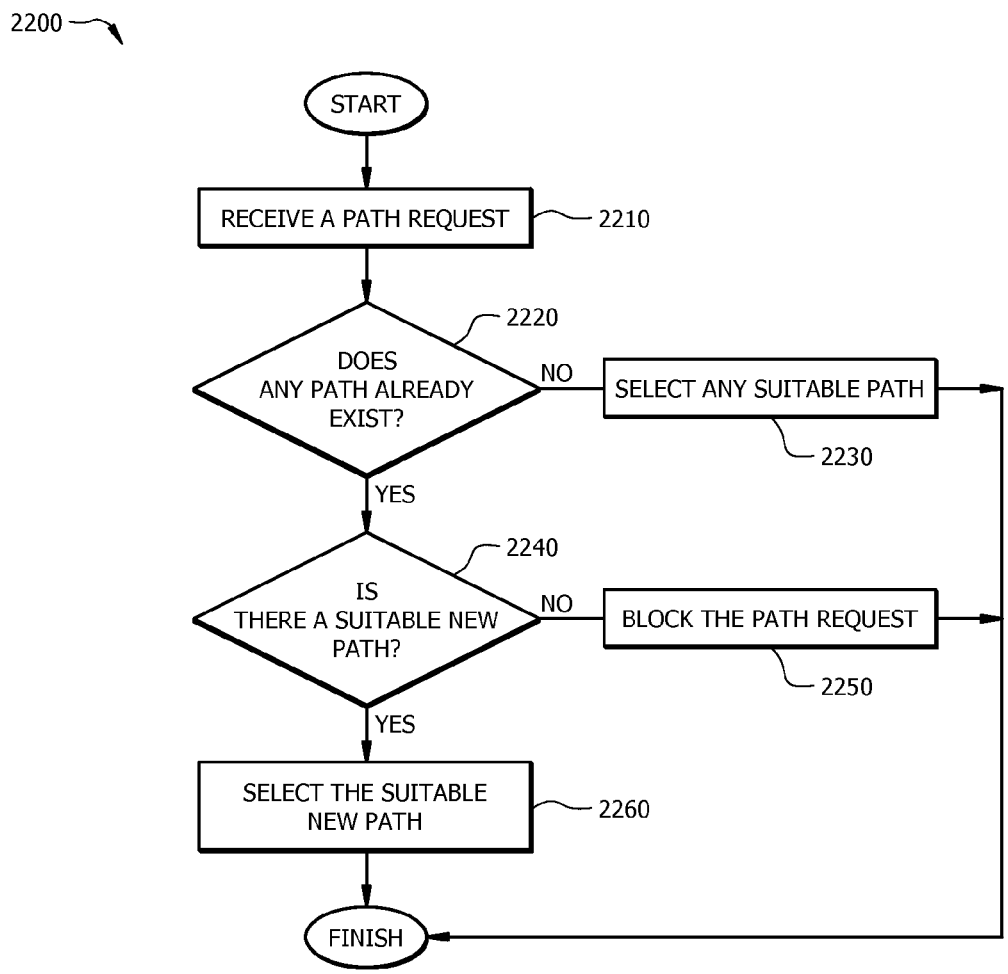
FIG. 22 is a flowchart illustrating a method for selecting a path according to an embodiment of the disclosure.

FIG. 22 is a flowchart illustrating a method 2200 for selecting a path according to an embodiment of the disclosure. The method may be implemented in the system 500, for instance in the processing unit 520. At step 2210, a path request is received. For instance, a first of the devices 570 communicates to the processing unit 520 a desire to transmit a packet to a second of the devices 570, and the processing unit 520 internally generates and receives the path request. The path request may be a request to route the packet from a specific input to a specific output, for instance a first input to a first output, of the optical switches 510.

At decision diamond 2220, it is determined whether any path already exists. For instance, the processing unit 520 determines whether it has created any path in the optical switches 510. The query is not limited to a path from the first input to the first output. In other words, it is determined whether the optical switches 510 have been initialized. If a path does not already exist, then the method 2200 proceeds to step 2230. At step 2230, any suitable path is selected. For instance, the processing unit 520 selects any suitable path from the first input to the second input of any one of the optical switches 510. If a path does already exist, then the method 2200 proceeds to decision diamond 2240.

At decision diamond 2240, it is determined whether there is a suitable new path. For instance, the processing unit 520 determines whether a suitable new path can connect the first input to the first output, while complying with the constraints that no two packets should pass through a cell at the same time and that existing paths should not be rearranged. If there is no suitable new path, then the method 2200 proceeds to step 2250. At step 2250, the path request is blocked and the method 2200 finishes. If there is a suitable new path, then the method 2200 proceeds to step 2260.

At step 2260, a suitable new path is selected and the method 2200 finishes. For instance, the processing unit 520 selects a suitable path determined at decision diamond 2240 that is through the optical switch 510 with the highest number of existing paths. The processing unit 520 may do so because it may instruct that optical switch 510 to switch packets only once that optical switch 510 has a pre-determined number of outstanding selected paths. In other words, packets may remain in a queue until that optical switch 510 fills up with selected paths.

Figure 23:
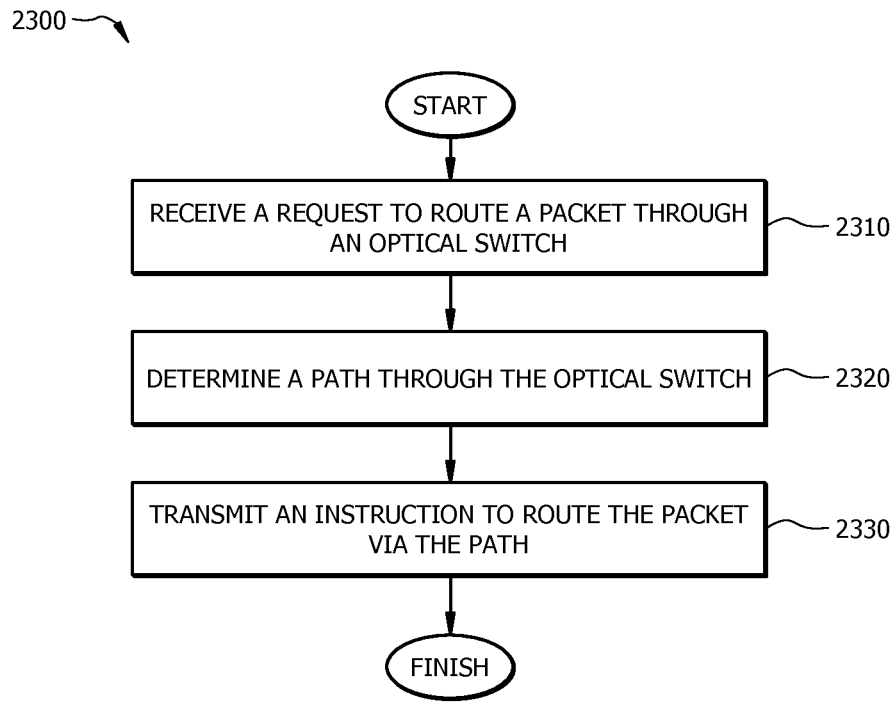
FIG. 23 is a flowchart illustrating a method for determining a path according to an embodiment of the disclosure.

FIG. 23 is a flowchart illustrating a method 2300 for determining a path according to an embodiment of the disclosure. The method may be implemented in the systems 500, 600, and 700. At step 2310, a request to route a packet through an optical switch is received from a device. For instance, the processing unit 520 receives from one of the devices 570 a request to route a packet through one of the optical switches 510, 650, 740, 800, 1500, 1600, 1700, 1800, 1900, and 2000.

At step 2320, a path through the optical switch is determined. For instance, the path selection module 540 within the processing unit 520 determines the path. The path passes through one of N optical inputs of a first stage of the optical switch, one of M inputs of a second sub-switch of a second stage of the optical switch, one of M inputs of a third sub-switch of a third stage of the optical switch, and one of N optical outputs of a fourth stage of the optical switch. N is an integer, and M is equal to N/4. Finally, at step 2330, an instruction to route the packet via the path is transmitted to the optical switch.

Figure 24:
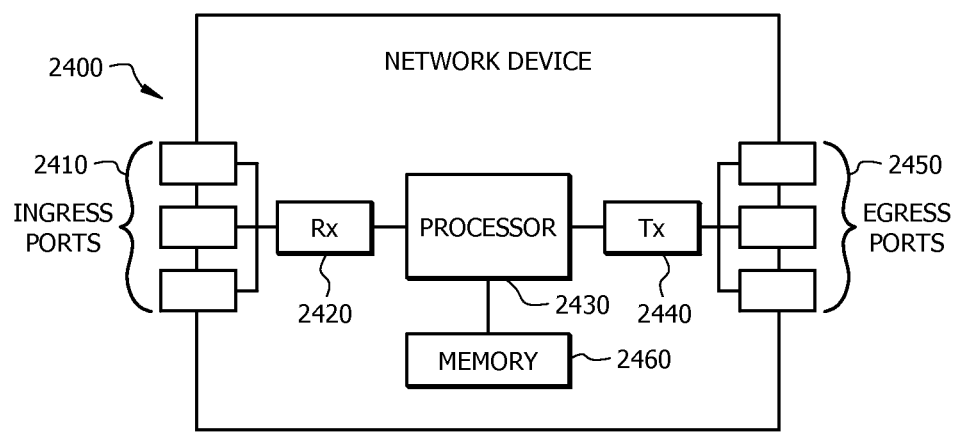
FIG. 24 is a schematic diagram of a network device.

FIG. 24 is a schematic diagram of a network device 2400. The network device 2400 may be suitable for implementing the disclosed embodiments. For instance, the network device 2400 may implement the processing unit 520 and the devices 570 in the system 500; the servers 610, the ToR switches 620, the aggregation nodes 630, and the controller 640 in the system 600; and the methods 2100, 2200, and 2300. The network device 2400 comprises ingress ports 2410 and receiver units (Rx) 2420 to receive data; a processor, logic unit, or central processing unit (CPU) 2430 to process the data; transmitter units (Tx) 2440 and egress ports 2450 to transmit the data; and a memory 2460 to store the data. The network device 2400 may also comprise EO components and OE components coupled to the ingress ports 2410, receiver units 2420, transmitter units 2440, and egress ports 2450 for egress or ingress of electrical or optical signals.

The processor 2430 may be implemented by hardware and software. The processor 2430 may be implemented as one or more CPU chips, cores (e.g., as a multi-core processor), field-programmable gate arrays (FPGAs), application specific integrated circuits (ASICs), and digital signal processors (DSPs). The processor 2430 is in communication with the ingress ports 2410, receiver units 2420, transmitter units 2440, egress ports 2450, and memory 2460.

The memory 2460 comprises one or more disks, tape drives, and solid-state drives and may be used as an overflow data storage device, to store programs when such programs are selected for execution, and to store instructions and data that are read during program execution. The memory 2460 may be volatile and non-volatile and may be read-only memory (ROM), random-access memory (RAM), ternary content-addressable memory (TCAM), and static random-access memory (SRAM).

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An optical switch comprising:
    a first stage comprising:
        N optical inputs, wherein N is an integer power of 2 and is 16 or greater; and
        N first sub-switches, wherein each first sub-switch comprises 1 of the optical inputs and 4 first outputs;
    a second stage coupled to the first stage and comprising 16 second sub-switches, wherein each second sub-switch comprises M second inputs and M second outputs, wherein the second sub-switches are evenly distributed into M first sections, wherein each first sub-switch is connected to each first section, and wherein M is equal to N/4;
    a third stage coupled to the second stage and comprising 16 third sub-switches, wherein each third sub-switch comprises M third inputs and M third outputs, and wherein each of the third inputs is connected to a respective second output; and
    a fourth stage coupled to the third stage and comprising:
        N optical outputs; and
        N fourth sub-switches, wherein each fourth sub-switch comprises 4 fourth inputs and 1 of the optical outputs.

2. The optical switch of claim 1, wherein each second sub-switch comprises at most one connection to its coupled third sub-switches.

3. The optical switch of claim 2, wherein each first sub-switch comprises 3 first cells.

4. The optical switch of claim 3, wherein each second sub-switch comprises $n_1$ second cells, wherein $n_1$ is greater than or equal to 4.

5. The optical switch of claim 4, wherein each third sub-switch comprises $n_2$ third cells, wherein $n_2$ is an integer greater than or equal to 4.

6. The optical switch of claim 5, wherein each fourth sub-switch comprises 3 fourth cells.

7. The optical switch of claim 6, wherein the first cells, the second cells, the third cells, and the fourth cells total $8N \log_2(N) + N(n_1 + n_2 - 26)$ cells.

8. The optical switch of claim 2, wherein the 16 second sub-switches are grouped into 4 first sections, and wherein each first section comprises 4 second sub-switches.

9. The optical switch of claim 2, wherein the 16 third sub-switches are grouped into 4 second sections, and wherein each second section comprises 4 third sub-switches.

10. An optical switching system comprising:
    an optical switch comprising:
        a first stage of first cells comprising N first inputs, wherein N is an integer;
        a second stage of second cells coupled to the first stage and forming a second number of second sub-switches;
        a third stage of third cells coupled to the second stage and forming a third number of third sub-switches, wherein at least one of the second sub-switches and the third sub-switches are M×M sub-switches, wherein the second sub-switches comprise a first number of cells and the third sub-switches comprise a second number of cells that is not equal to the first number, and wherein M is equal to N/4; and
        a fourth stage of fourth cells coupled to the third stage and comprising N fourth outputs; and
    a processor coupled to the optical switch.

11. The system of claim 10, wherein the third sub-switches and the fourth sub-switches are 16 M×M sub-switches.

12. The system of claim 10, further comprising a plurality of devices coupled to the optical switch, comprising a central processing unit (CPU), a memory, or a combination of a CPU and a memory, and configured to communicate data among themselves via the optical switch.

13. The system of claim 10, wherein the processor comprises:
    a switch driver module;
    a path selection module; and
    an arbitration module.

14. The system of claim 13, wherein the switch driver module is a high-speed analog current circuit configured to drive the optical switch.

15. The system of claim 13, wherein the path selection module is configured to implement an algorithm to find paths through the optical switch.

16. The system of claim 13, wherein the arbitration module is configured to perform scheduling and contention control for packets passing through the optical switch.

17. The optical switching system of claim 10, wherein the second sub-switches are evenly distributed into M first sections, and wherein each first sub-switch is connected to each first section.

18. A method of designing an optical switch, the method comprising:
- determining N, wherein N is an integer power of 2 and is 16 or greater;
- determining M, wherein M is equal to N/4;
- providing N optical inputs;
- providing a first stage of N first sub-switches, wherein each first sub-switch comprises 1 first input and 4 first outputs;
- coupling the first inputs to the optical inputs;
- providing a second stage of 16 second sub-switches, wherein each second sub-switch comprises M second inputs and M second outputs;
- coupling the second stage to the first stage;
- providing a third stage of 16 third sub-switches, wherein each third sub-switch comprises M third inputs and M third outputs, wherein the second sub-switches comprise a first number of cells and the third sub-switches comprise a second number of cells that is not equal to the first number, and wherein each of the third inputs is connected to a respective second output;
- coupling the third stage to the second stage;
- providing a fourth stage of N fourth sub-switches, wherein each fourth sub-switch comprises 4 fourth inputs and 1 fourth output;
- coupling the fourth stage to the third stage;
- providing N optical outputs; and
- coupling the optical outputs to the fourth outputs.

19. The method of claim 18, wherein each second sub-switch comprises at most one connection to its coupled third sub-switches.

20. The method of claim 19, wherein each first sub-switch comprises 3 first cells, wherein each second sub-switch comprises $n_1$ second cells, wherein $n_1$ is an integer greater than or equal to 4, wherein each third sub-switch comprises $n_2$ third cells, wherein $n_2$ is an integer greater than or equal to 4, wherein each fourth sub-switch comprises 3 fourth cells, and wherein the optical switch comprises a total of $N(n_1+n_2-26)+8N \log_2(N)$ cells.

21. A method comprising:
- receiving, from a device, a request to route a packet through an optical switch;
- determining a path through the optical switch, wherein the path passes through one of N optical inputs of a first stage of the optical switch, one of M inputs of a second sub-switch of a second stage of the optical switch, one of M inputs of a third sub-switch of a third stage of the optical switch, and one of N optical outputs of a fourth stage of the optical switch, wherein the second sub-switches comprise a first number of cells and the third sub-switches comprise a second number of cells that is not equal to the first number, and wherein N is an integer and M is equal to N/4; and
- transmitting, to the optical switch, an instruction to route the packet via the path.

* * * * *